(12) United States Patent
Bollin et al.

(10) Patent No.: US 10,653,064 B2
(45) Date of Patent: May 19, 2020

(54) DRIVER ASSISTANCE SYSTEM

(71) Applicant: Deere & Company, Moline, IL (US)

(72) Inventors: Douglas J. Bollin, Port Byron, IL (US); Emily L. Seidel, Moline, IL (US); Marguerite Taylor, Bettendorf, IA (US); Mario L. Donini, Bettendorf, IA (US)

(73) Assignee: Deere & Company, Moline, IL (US)

( * ) Notice: Subject to any disclaimer, the term of this patent is extended or adjusted under 35 U.S.C. 154(b) by 208 days.

(21) Appl. No.: 15/706,904

(22) Filed: Sep. 18, 2017

(65) Prior Publication Data

US 2019/0082593 A1    Mar. 21, 2019

(51) Int. Cl.
| | | |
|---|---|---|
| *A01D 41/127* | (2006.01) | |
| *G06F 7/00* | (2006.01) | |
| *G06F 19/00* | (2018.01) | |
| *B60W 50/08* | (2020.01) | |
| *G05B 13/02* | (2006.01) | |

(52) U.S. Cl.
CPC .......... *A01D 41/127* (2013.01); *B60W 50/08* (2013.01); *G05B 13/021* (2013.01)

(58) Field of Classification Search
CPC ........ A01D 41/127; G06F 19/00; G06F 7/00; B60R 25/20; G07C 5/00; G09G 5/00; B60K 35/00; G01R 31/06; G08B 17/00; G01B 7/00
See application file for complete search history.

(56) References Cited

U.S. PATENT DOCUMENTS

| | | | | |
|---|---|---|---|---|
| 5,566,092 A | * | 10/1996 | Wang ................ | G05B 19/4184 700/159 |
| 5,880,710 A | * | 3/1999 | Jaberi .................... | B60K 35/00 345/618 |
| 8,994,539 B2 | * | 3/2015 | Grohman ........... | G05B 23/0272 340/584 |
| 2006/0006879 A1 | * | 1/2006 | Mirafzal .............. | G01R 31/343 324/545 |
| 2009/0299568 A1 | * | 12/2009 | Schlingmann ....... | G05B 19/042 701/33.4 |
| 2010/0071329 A1 | * | 3/2010 | Hindryckx ........... | A01D 41/127 56/10.2 R |
| 2010/0217474 A1 | * | 8/2010 | Baumgarten ........ | A01D 41/127 701/31.4 |
| 2014/0277844 A1 | * | 9/2014 | Luke ..................... | G07C 5/008 701/2 |

(Continued)

FOREIGN PATENT DOCUMENTS

DE    10215216081 A1    3/2016

OTHER PUBLICATIONS

Extended European Search Report Application No. 18193087.6, dated Feb. 15, 2019, 4 pages.

*Primary Examiner* — Yuri Kan
(74) *Attorney, Agent, or Firm* — Joseph R. Kelly; Kelly, Holt & Christenson PLLC

(57) ABSTRACT

User interfaces are displayed so that a user can select a plurality of different performance issues, along with a severity level for each issue. A solution (or a set of solutions) that address(es) the performance issues is identified and the solution (or set) is surfaced for user interaction. A control signal is generated based on user interaction with the surfaced solution (or set of solutions), in order to take corrective action on the harvester based upon the selected solution.

20 Claims, 27 Drawing Sheets

(56) References Cited

U.S. PATENT DOCUMENTS

| | | |
|---|---|---|
| 2015/0046043 A1 | 2/2015 | Bollin et al. |
| 2015/0199637 A1 | 7/2015 | Pfeiffer et al. |
| 2016/0078391 A1 | 3/2016 | Blank et al. |
| 2017/0036645 A1* | 2/2017 | Boran .................... B60R 25/24 |

* cited by examiner

DRIVER ASSISTANCE SYSTEM

FIELD OF THE DESCRIPTION

The present description relates to a driver assist system. More specifically, the present description relates to a driver assist system for improving performance of an agricultural harvesting machine.

BACKGROUND

There are a wide variety of different types of agricultural mobile machines. Some machines include agricultural harvesters, such as combine harvesters, among others.

Combine harvesters can be relatively complicated to operate. There may be a wide variety of different mechanisms that have settings that are adjusted in order to change the performance of the combine harvester. Also, the settings need to be changed based upon a wide variety of different variables, such as weather, terrain, crop type, soil conditions, among other things. Some settings that are controllable by the operator, include such things as machine speed, concave clearance, sieve and chaffer settings, cleaning fan speed, various parts of the machine configuration, rotor speed, among a wide variety of others.

Often, an operator observes the performance of the harvester and attempts to make adjustments to the various settings in order to improve or maintain performance. However, it is common that, when an operator changes one setting, this may increase performance of the harvester in one area, while reducing the performance of the harvester in a different area. For example, if the operator makes a settings change on a harvester to decrease the grain loss during harvesting, this same adjustment may increase the amount of material other than grain that enters the clean grain tank. This is just one example, and there are many other examples of how adjustments to various settings can affect different performance areas of the harvester, in different ways.

The discussion above is merely provided for general background information and is not intended to be used as an aid in determining the scope of the claimed subject matter.

SUMMARY

User interfaces are displayed so that a user can select a plurality of different performance issues, along with a severity level for each issue. A solution (or a set of solutions) that address(es) the performance issues is identified and the solution (or set) is surfaced for user interaction. A control signal is generated based on user interaction with the surfaced solution (or set of solutions), in order to take corrective action on the harvester based upon the selected solution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 5A-5I show examples of user interface displays.

FIGS. 6A-6F show examples of user interface displays.

FIGS. 7A-7D show examples of user interface displays.

DETAILED DESCRIPTION

Combine harvesters often have a wide variety of sensors that sense a variety of different variables, such as operating parameters, along with crop characteristics, environmental parameters, etc. The sensors can communicate this information over a controller area network (CAN) bus (or another network, such as an Ethernet network, etc.) to various systems that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to make adjustments to settings and/or machine configuration to maintain high performance. The present description describes a way that an operator can flag one or more performance issues being observed, and assign severity levels to each. Based on the issues and severity levels, solutions are surfaced and can be automatically implemented.

Figure 1:
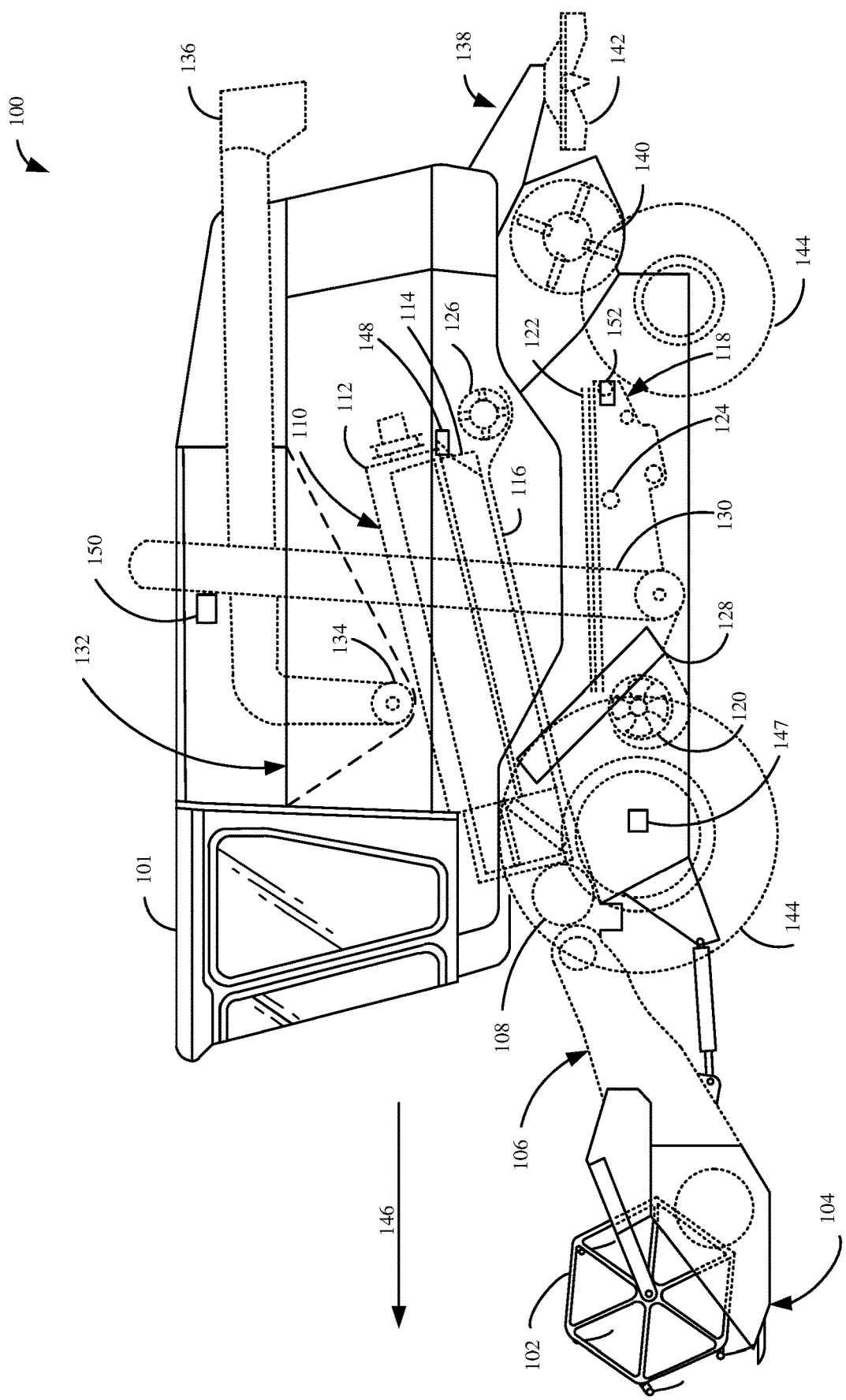
FIG. 1 is a partial pictorial, partial schematic view of a mobile harvesting machine.

FIG. 1 is a partial pictorial, partial schematic, illustration of an agricultural machine 100, in an example where machine 100 is a combine harvester (also referred to as combine 100 or machine 100). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well. FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They can include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) sensor and a MOG moisture sensor that can be configured to sense an amount of MOG entering the clean grain tank and the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
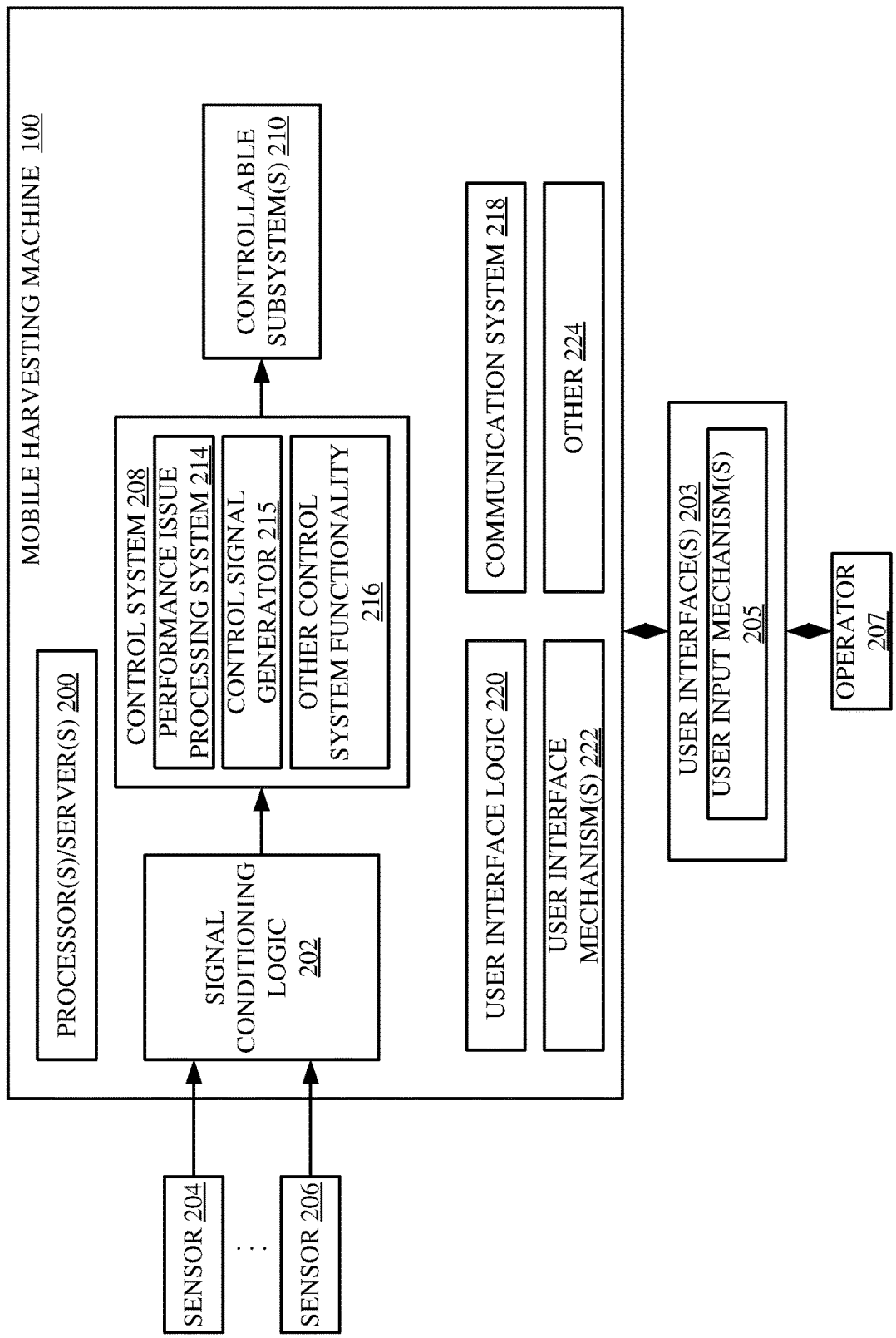
FIG. 2 is a block diagram showing some parts of the mobile harvesting machine illustrated in FIG. 1.

FIG. 2 is a block diagram of mobile harvesting machine (combine) 100, showing some items that are similar to those shown in FIG. 1, and which are similarly numbered. FIG. 2 also shows that, in one example, mobile harvesting machine 100 illustratively generates user interfaces 203 with user input mechanisms 205 for interaction by operator 207. Operator 207 can interact with user input mechanisms 205 in order to control and manipulate various functions on mobile harvesting machine 100.

In FIG. 2, mobile harvesting machine 100 illustratively includes one or more processors or servers 200, signal conditioning logic 202 that receives sensor signals from a plurality of different sensors 204-206. Machine 100 also includes control system 208, controllable subsystems 210, user interface logic 220, communication system 218, user interface mechanism 222 and it can include a wide variety of other items 224.

Sensors 204-206 can be any or all of the sensors discussed above with respect to FIG. 1, or different or additional sensors. Signal conditioning logic 202 illustratively performs signal conditioning on the sensor signals. The signal conditioning can include such things as amplification, linearization, normalization, filtering, etc. The conditioned signals are then provided to control system 208 that generates control signals to control one or more controllable subsystems 210.

Control system 208 illustratively includes sensor signal processing logic 212, performance issue processing system 214, control signal generator 215, and it can include a wide variety of other control system functionality 216. Sensor signal processing logic 212 illustratively processes the sensor signals and performance issue processing system 214 illustratively surfaces one or more corrective actions or solutions to problems that may be observed and input by an operator. Control signal generator 215 generates control signals that can be used to control any of a wide variety of different controllable subsystems 210.

The controllable subsystems can include such things as the propulsion system which drives mobile harvesting machine 100, the fan speed systems that drive the fan speed of various fans, including a cleaning fan, the rotor drive system that drives rotor speed of the rotors, among a wide variety of other things. Mobile harvesting machine 100 also illustratively includes communication system 218 that can be used to communicate with a wide variety of other systems (not shown). Thus, communication system 218 can include logic for communicating over a wide area network, a local area network, a controller area network, a cellular network, a near field communication network, among a wide variety of other networks or combinations of networks. User interface logic 220 can be used to control user interface mechanisms 222 and to detect inputs through mechanisms 222. The mechanisms can include such things as a display screen, user actuatable elements on a display screen (such as buttons, icons, links, etc.), switches, levers, joysticks, steering wheels, pedals, haptic and audio devices (e.g., microphones/speakers), among a wide variety of other things. Mobile harvesting machine 100 can also include a wide variety of other items 224.

As is described in greater detail below with respect to FIGS. 3 and 4, performance issue processing system 214 illustratively displays a user interface display, and controls user interface logic 220 and user interface mechanisms 222, to conduct a user experience that allows operator 207 to input a machine performance issue or problem (or more than one) that operator 207 observes with respect to mobile harvesting machine 100, along with a severity level for each issue or problem. The machine performance issues or problems can, for example, identify areas of performance that the operator observes as being deficient, or that fall below performance thresholds. It then identifies a solution based upon the one or more issues or problems input by operator 207, along with their severity level, and generates a control signal that can be used to take corrective action. The control signal can be used to control any one or more of the controllable subsystems 210, or it can be used to control user interface mechanisms 222 to display actions for operator 207, or it can take a wide variety of other forms.

Figure 3:
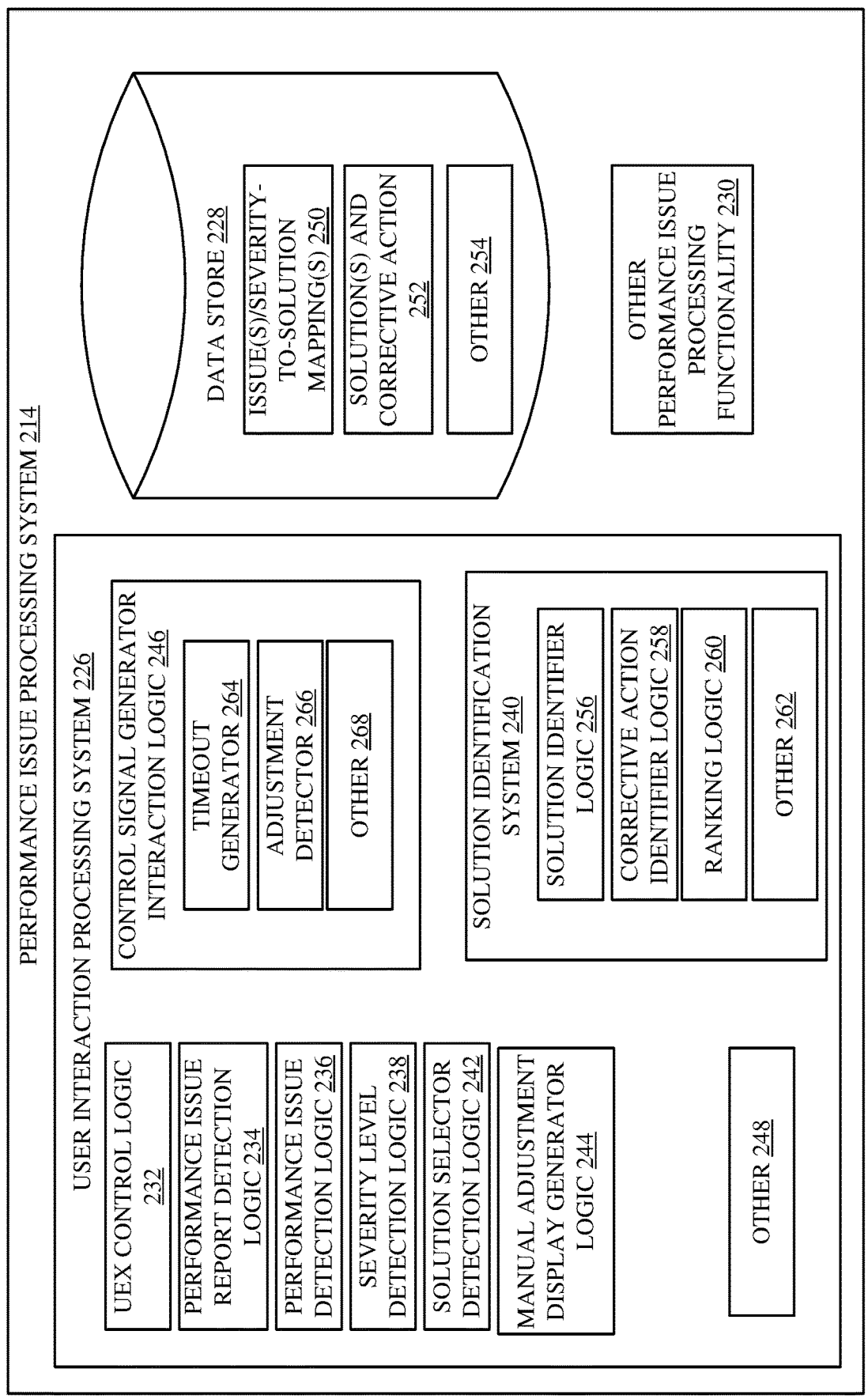
FIG. 3 is a block diagram showing one example of a performance issue processing system in more detail.

FIG. 3 is a block diagram showing one example of performance issue processing system 214, in more detail. In the example shown in FIG. 3, system 214 illustratively includes user interaction processing system 226, data store 228, and it can include a wide variety of other performance issue processing functionality 230. User interaction processing system 226, itself, illustratively includes user experience (UEX) control logic 232, performance issue report detection logic 234, performance issue detection logic 236, severity level detection logic 238, solution identification system 240, solution selector detection logic 242, manual adjustment display generator logic 244, control signal generator interaction logic 246, and it can include other items 248. Data store 228 can include issues/severity-to-solution mappings 250, solutions and corrective actions 252, and it can include other items 254. Solution identification system 240 can include solution identifier logic 256, corrective action identifier logic 258, ranking logic 260, and it can include other items 262. Control signal generator interaction logic 246 can include time out generator 264, adjustment detector 266, and it can include other items 268. Before describing the overall operation of performance issue processing system 214 in more detail, a brief description of some of the items in performance issue processing system 214, and their operation, will first be provided.

UEX control logic 232 illustratively controls user interface logic 220 on mobile harvesting machine 110 to generate user interfaces and conduct user experiences through which the operator 207 performs various actions. Performance issue report detection logic 234 illustratively detects a user input indicating that operator 207 wishes to report a performance issue. Performance issue detection logic 236 illustratively detects a user input selecting one or more issues that the user is observing with respect to the performance of harvesting machine 100. Severity level detection logic 238 illustratively generates user input mechanisms that can be used by operator 207 to identify a severity level corresponding to each of the issues reported by the user. In one example, once the performance issues have been identified and a severity level for each has also been identified, solution identification system 240 illustratively identifies a solution that will likely reduce the severity of the reported issue(s), if not outright fix it. In doing so, solution identifier logic 256 identifies a solution that will likely increase the performance of machine 100 with respect to all issues that have been reported by operator 207. Solution identifier logic 256 may also identify a list of solutions that are likely to fix the issues, and rank them in order of how likely or probable it is that they will address the reported performance issues. Each of the solutions may have one or more corrective actions that can be taken either automatically or manually, and corrective action identifier logic identifies the corrective actions corresponding to the various solutions that were identified. It will also be noted that, in one example, the user can change the issues and/or corresponding severity levels at any time, and a new list of solutions is generated.

In identifying the solutions and corrective actions, logic 256 and 258 may illustratively access mappings 250 that map performance issues and their corresponding severity levels to different solutions. Once the solutions are identified, solutions and corrective actions 252 can be accessed to determine any actions that are to be taken in order to implement the corresponding solution. Ranking logic 260 then ranks the various solutions that have been identified, in order of how likely or probable it is that they will address the one or more issues identified by operator 207. It will also be appreciated that the likelihood or probability are examples only and other measure of certainty level corresponding to each solution can be used as well.

Solution identification system 240 then generates a user interface that surfaces (e.g., displays) the list of solutions for user interaction. It may be that the user can interact with the list in various ways, such as to select one or more of the solutions, scroll through the list of solutions, etc. Solution selector detection logic 242 detects a user interaction that selects a solution that is to be implemented or applied on mobile harvesting machine 100. Control signal generator interaction logic 246 illustratively interacts with control signal generator 215 (shown in FIG. 1) so control signals are generated to apply the selected solution. For instance, if the solution is to increase the fan speed of the cleaning fan, then logic 246 can indicate this to control signal generator 215 which can then generate a control signal to automatically increase the speed of the cleaning fan. This is just one example.

It may be that mobile harvesting machine 100 needs to harvest for a certain amount of time before the effect of the adjustment or solution can be observed in the performance of machine 100. Therefore, in one example, adjustment detector 266 detects when the adjustment has been made (e.g., when the selected solution has been implemented) and timeout generator 264 illustratively generates a timeout so that the user does not make additional performance adjustments before seeing how the one that has just been made affects the performance of the harvesting machine. This is referred to as reaching steady state after a settings adjustment has been made. In one example, the time to reach steady state after an adjustment setting has been changed may be a predefined amount of time. It may vary depending on the setting change that was made, or it may be the same for all setting adjustments or solution implementations. It can also illustratively vary or be dynamically determined based upon the vehicle speed, the crop type being harvested, the crop or soil conditions, etc. Also, in another example, no time out period is used and, as soon as the adjustment is completed (or at any time) the user can report new issues and/or severity levels.

Adjustment detector 266 can be any of a wide variety of different types of sensors or detectors that detects when the settings adjustment has actually been made on the machines. For instance, if the settings adjustment is to increase the cleaning fan speed by 100 revolutions per minute, then detector 266 may monitor a fan speed sensor to determine when the fan speed has reached the new speed level corresponding to the settings adjustment. If the solution is to increase machine ground speed by 3 miles per hour, then detector 266 may communicate with a speed sensor to determine when the new ground speed has been reached. These are examples only.

It may also be that some or all of the steps needed to implement the solution are manual adjustments or manual steps. In that case, manual adjustment display generator logic 244 controls user interface logic 220 to generate a display displaying the manual adjustments or settings that need to be changed. Detector 266 can detect a user input confirming that the manual adjustments have been made.

Figure 4A:
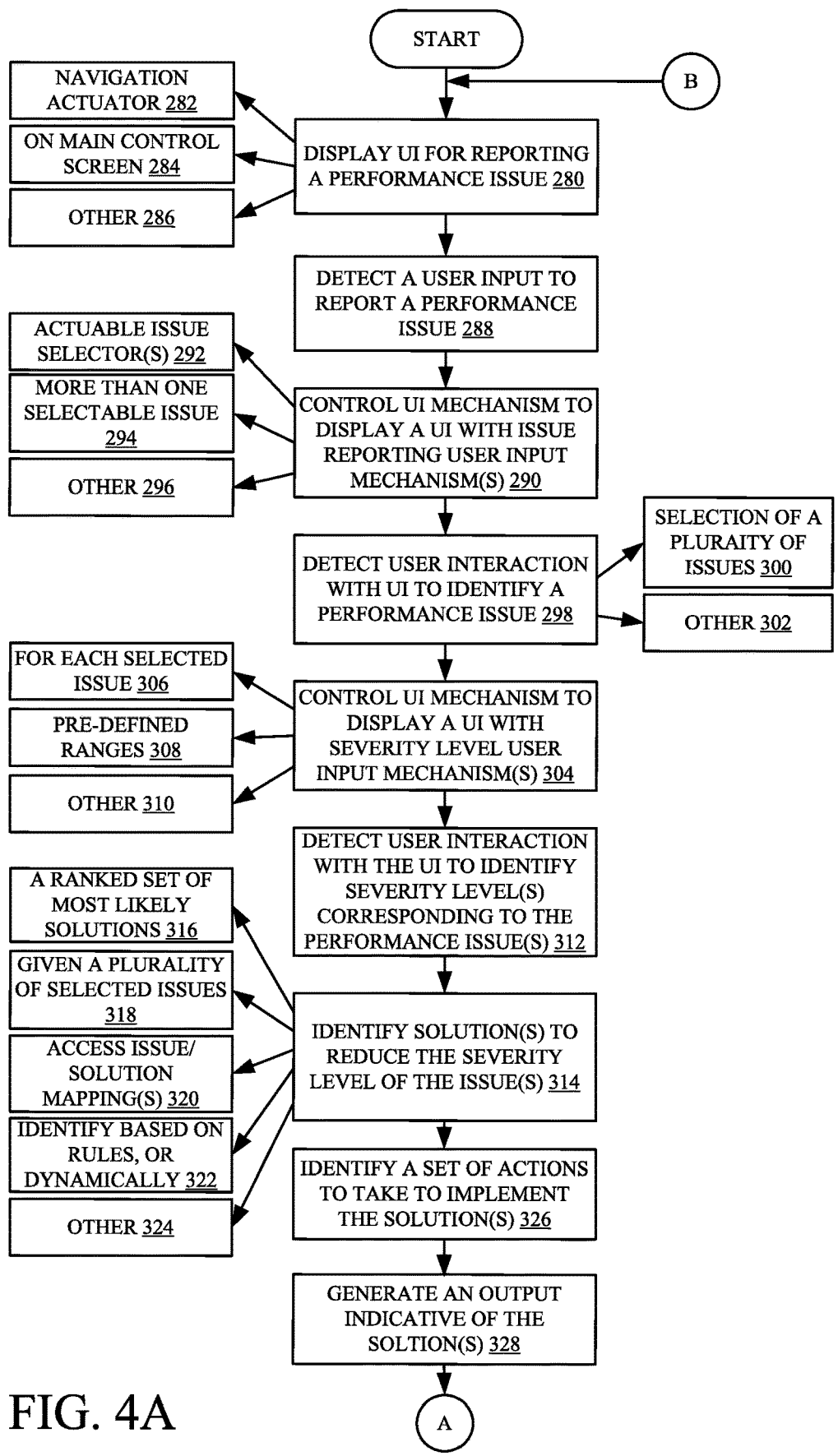
FIGS. 4A-4B (collectively referred to herein as FIG. 4) illustrate a flow diagram showing one example of the operation of the mobile harvesting machine illustrated in previous figures.
Figure 4B:
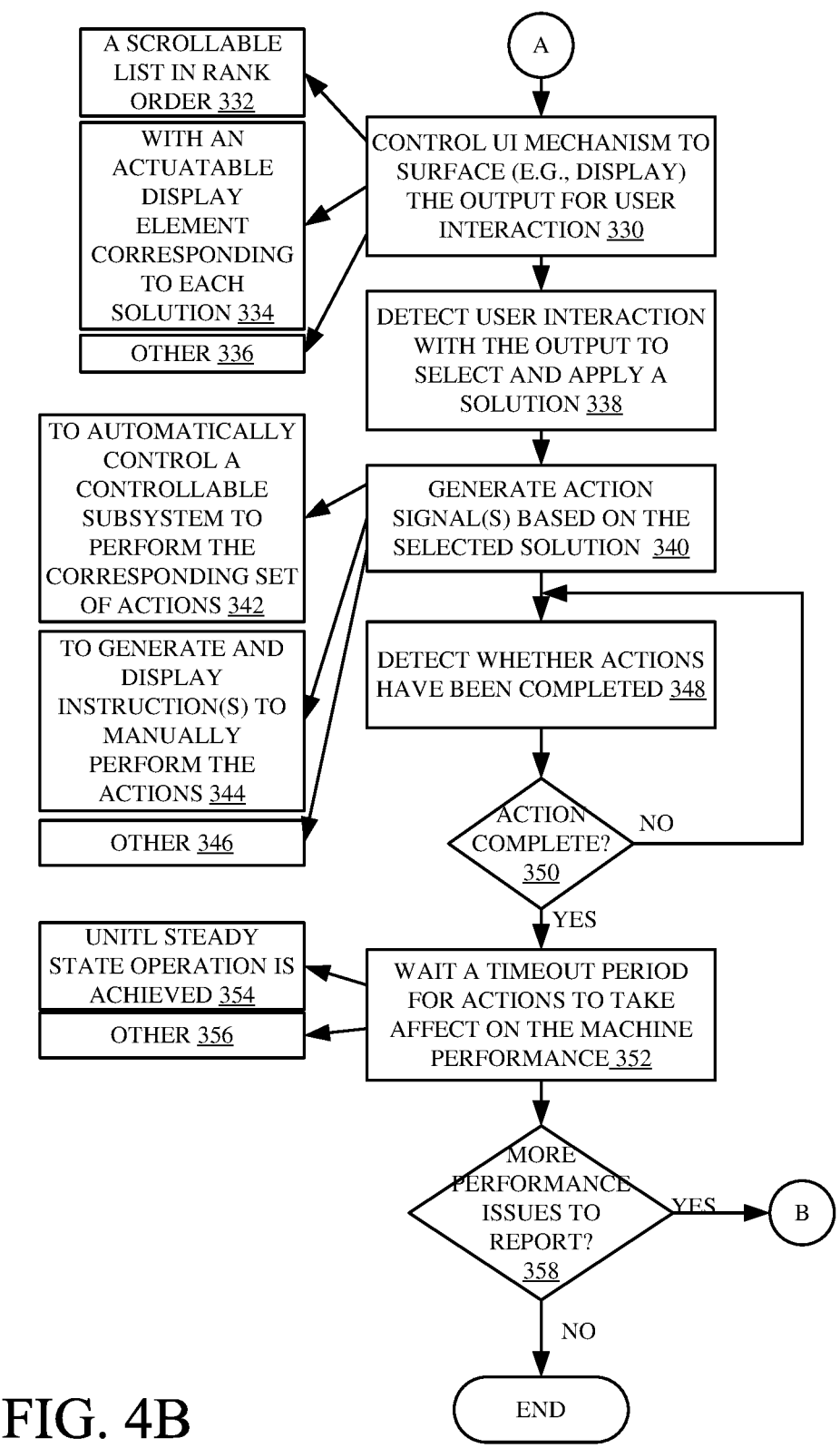

FIGS. 4A and 4B (collectively referred to herein as FIG. 4) show a flow diagram illustrating one example of the operation of harvesting machine 100, in allowing operator 207 to identify a performance issue and to then surface solutions and corresponding corrective actions that can be made automatically or manually based upon the reported issue. Some examples of user interfaces that can be generated are described below with respect to FIGS. 5A-7D.

In one example, it is assumed that UEX control logic 232 has generated a user interface display that provides input mechanisms so that operator 207 can report a performance issue with respect to machine 100. This is indicated by block 280 in the flow diagram of FIG. 4. In one example, it displays a navigation actuator 282 that can be actuated by operator 207 in order to launch an application or logic that allows reporting of performance issues and surfacing of corresponding solutions. In another example, the application or logic can be running and the display that allows operator 207 to report an issue can be generated on a main control screen of mobile harvesting machine 100. This is indicated by block 284. The user interface display for reporting a performance issue can be generated in a wide variety of other ways as well, and this is indicated by block 286.

Performance issue report detection logic 234 then detects a user input indicating that the operator 207 wishes to report a performance issue. This is indicated by block 288. This can be done, for instance, by selecting a button or an icon on a user interface display, or in other ways.

Performance issue detection logic 236 then controls a user interface mechanism 222 (such as a touch sensitive display screen) to display a user interface with one or more issue reporting input mechanisms. This is indicated by block 290. For example, the user input mechanisms can be actuatable issue selectors 292 that can be actuated by the user to select or input a performance issue to be reported. In one example, the user interface allows the user to select or input more than one issue to report, at a given time. Thus, for instance, if operator 207 is observing multiple different performance issues, at the same time, operator 207 can illustratively report that all of those issues are occurring at the same time, through the interface. This may lead to a different list of likely solutions then if only one performance issue or a different subset of performance issues were reported. Allowing operator 207 to select or input more than one issue is indicated by block 294. The user interface mechanism can be controlled to display an issue reporting interface in other ways as well, and this is indicated by block 296.

Performance issue detection logic 236 then detects user interaction with the user interface to identify one or more performance issues. This is indicated by block 298. For instance, it can detect that the user has selected one or more different performance issues on the interface, as indicated by block 300. Detecting the selection or identification of an issue that is being reported can be done in other ways (such as entering it in a text box, or speaking it into a speech recognition system) as well, and this is indicated by block 302.

Severity level detection logic 238 then controls a user interface mechanism to display a user interface with a severity level user input mechanism that allows operator 207 to select or input a severity level for each of the different issues that he or she has reported. This is indicated by block 304. Selecting or inputting a severity level, individually, for each of the reported issues is indicated by block 306. Some examples of a severity level user interface display are described in greater detail below, and they can include things such as a continuous display element that allows the operator 207 to select a severity level along a continuously varying scale. It can allow the operator 207 to select one of a variety of different predefined ranges as indicated by block 308, or the severity level selector can take a wide variety of other forms as well, and this is indicated by block 310.

Severity level detection logic 238 then detects user interaction with the user interface to identify a severity level corresponding to each of the performance issues that were reported. This is indicated by block 312.

Solution identification system 240 then identifies one or more solutions that are likely to at least reduce the severity level of the reported issue or issues. This is indicated by block 314. As discussed above, solution identifier logic 256 and corrective action identifier logic 258 can identify a solution and the corresponding corrective actions by accessing different mappings and collections of actions 250 and 252, respectively, or they can identify the solutions and corresponding corrective actions dynamically, or in other ways. Ranking logic 260 can rank the set of solutions that have been identified, in order of how likely or probable they are to address the reported issues. Identifying a ranked set of most likely solutions is indicated by block 316. The solutions can be identified given the one or more different problems that have been identified by the user. This is indicated by block 318. Again, they can be identified by accessing mappings as indicated by block 320, or they can be identified in other ways, such as using rules or heuristics, a dynamic model or otherwise dynamically identifying the solutions, etc. This is indicated by block 322. The solutions can be identified in a wide variety of other ways as well, and this is indicated by block 324.

Once the solutions have been identified, the corresponding set of corrective actions that are to be performed in order to implement the solutions can also be identified. As discussed above, the corrective actions can be identified at the same time as the solutions, or they can be identified after a solution is selected by the operator. Identifying the set of actions is indicated by block 326 in the flow diagram of FIG. 4.

Solution identification system 240 then generates a solutions output indicative of the solutions that have been identified. This is indicated by block 328. UEX control logic 232 then illustratively controls a user interface mechanism to surface (e.g., display) the output for operator interaction. This is indicated by block 330. For instance, the set of possible solutions can be displayed as a scrollable list that can be scrolled by operator 207. This is indicated by block 332. The solutions can each be generated with a display element which can be actuated by operator 207 to select a solution for implementation. Displaying the solutions with actuatable display elements is indicated by block 334. The output with the set of identified solutions can be surfaced or displayed in other ways as well, and this is indicated by block 336.

Solution selector detection logic 242 then detects user interaction with the output to select and apply a solution. This is indicated by block 338.

Control signal generator interaction logic 246 can illustratively interact with control signal generator 215 in FIG. 1 to generate control signals based on the selected solution. This is indicated by block 340. The control signals can take a wide variety of different forms. For instance, they can be control signals to automatically control a controllable subsystem 210 in order to perform the set of corrective actions corresponding to the identified solution that is being implemented or applied. This is indicated by block 342. The control signals can be used to control manual adjustment display generator logic 244 to generate and display instructions to manually perform some or all of the actions needed to implement the selected solution. This is indicated by block 344. The control signals can be generated in a wide variety of other ways as well, and this is indicated by block 346.

Adjustment detector 266 then detects when the adjustments or corrective actions have been completed. This is indicated by block 348. For instance, if the corrective actions are used to change a fan speed, then it detects when the fan speed has reached its new level. If they are to perform manual adjustments to ground speed, for instance, or to the separator vane, for instance, then it detects whether those adjustments have been made, or for an operator input indicating that the adjustments have been made.

Once the corrective actions have been detected, as indicated by block 350, then, in one example, timeout generator 264 waits for the actions to take effect on the machine performance. This is indicated by block 352. In another example, no timeout period is used and operator 207 can report new issues and/or severity levels as soon as the adjustment is made. Where the timeout period is used, then it can be set in a variety of ways. For instance, when the ground speed of harvesting machine 100 is adjusted, it may take 30 seconds for the performance of the machine to reach its new steady state. However, when the cleaning fan speed is changed, it may take more or less time to reach steady state. Therefore, in one example, timeout generator 264 can generate a timeout period that varies based upon the corrective actions that have been taken, or it can generate a timeout period that is predetermined or that is a set amount of time. Setting the timeout to occur in order for machine 100 to reach steady state operation is indicated by block 354, and setting the timeout in other ways is indicated by block 356.

Once the adjustments have been made, and the timeout period has been reached, then operator 207 can again observe machine performance to see if the same issue persists, or if any more performance issues are encountered. If more performance issues (e.g., the same or different performance issues) are to be reported, as indicated by block 358, then processing reverts to block 280 above.

Figures 5A, 5B:
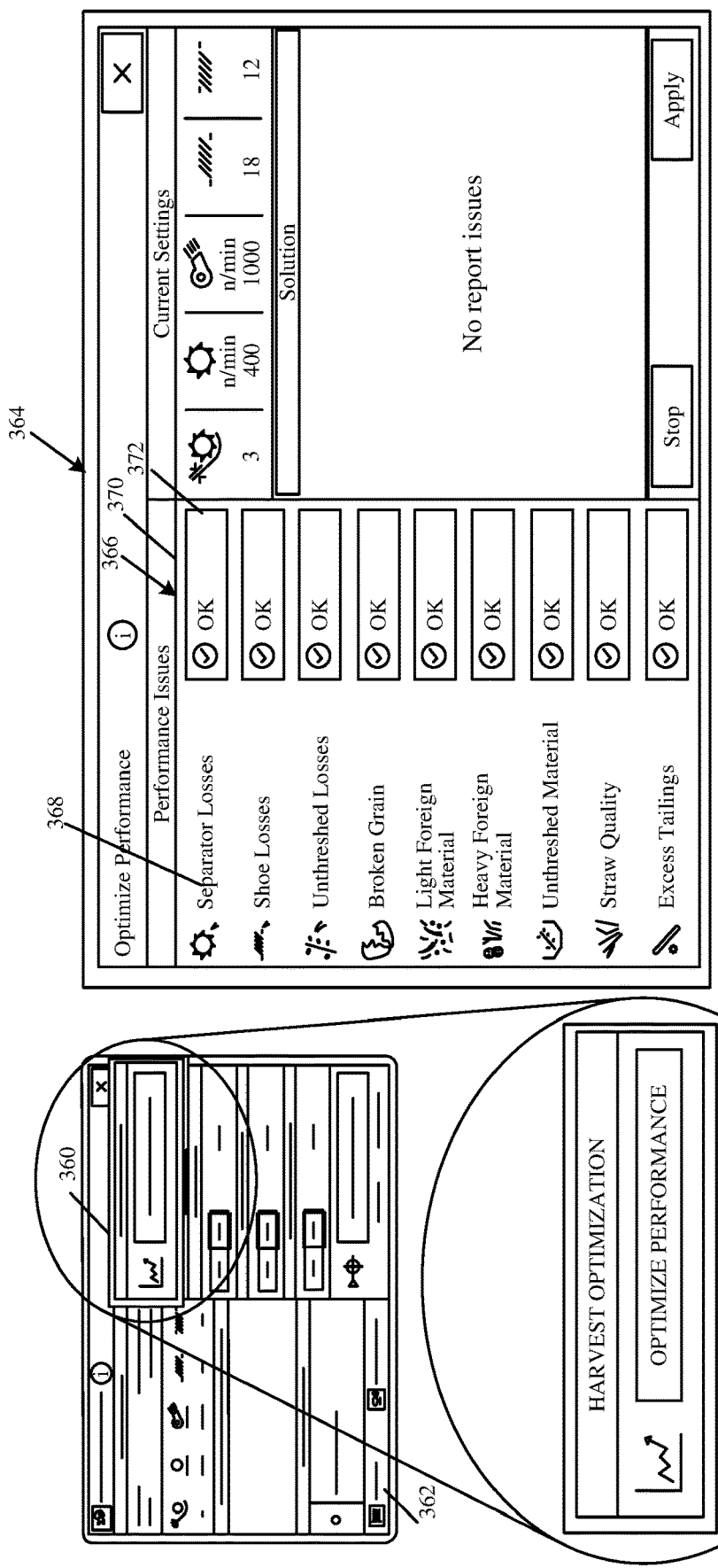

FIGS. 5A-7D are examples of user interfaces that can be generated, as described above. In one example, FIG. 5A shows that a user actuatable element 360 is displayed on a main control screen 362 of mobile harvesting machine 100. When the user actuates display element 360, then the UEX control logic 232 conducts a user experience such as that described above with respect to FIG. 4. By way of example, it can generate a user interface display 364 (as shown in FIG. 5B) that can be used to report any issues by operator 207. Therefore, user interface display 364 includes an issue reporting section 366. Issue reporting section 366 lists a plurality of performance issues (which can be scrollable) in column 368. Each issue has a corresponding actuator in column 370. The actuator can be actuated to identify that the corresponding issue is occurring, and it can also be actuated to identify the severity level of the corresponding issue.

Figure 5C:
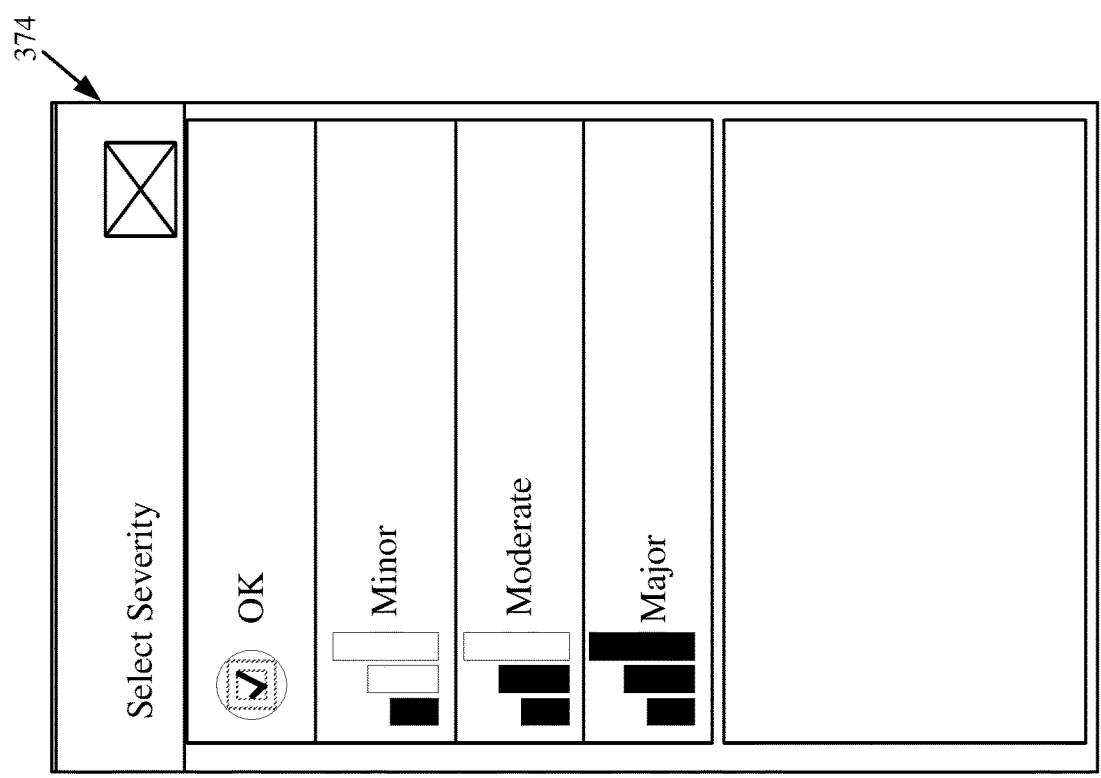

By way of example, assume that the user actuates user actuatable display element 372 which corresponds to separator loss. In one example, severity level detection logic 238 can then illustratively generate the user interface display 374 shown in FIG. 5C. This allows the user to actuate a display element corresponding to one of a variety of different severity levels. In the example shown in FIG. 5C, there is a user actuatable display element corresponding to minor, moderate and major severity levels. It will be noted that the severity level detection logic 238 can generate a display that allows operator 207 to select one of a plurality of predefined severity levels, as shown in FIG. 5C, or it can allow operator 207 to select a severity level on a continuous scale, such as by using a slider or entering a number indicative of severity level, etc.

Once the user identifies one of the severity levels, then severity level detection logic 238 can illustratively return to displaying a display 376 (FIG. 5D), which is similar to display 364 shown in FIG. 5B, except that the user interface display element 372 now shows that the performance issue with separator loss has a moderate severity level assigned.

Figure 5D:
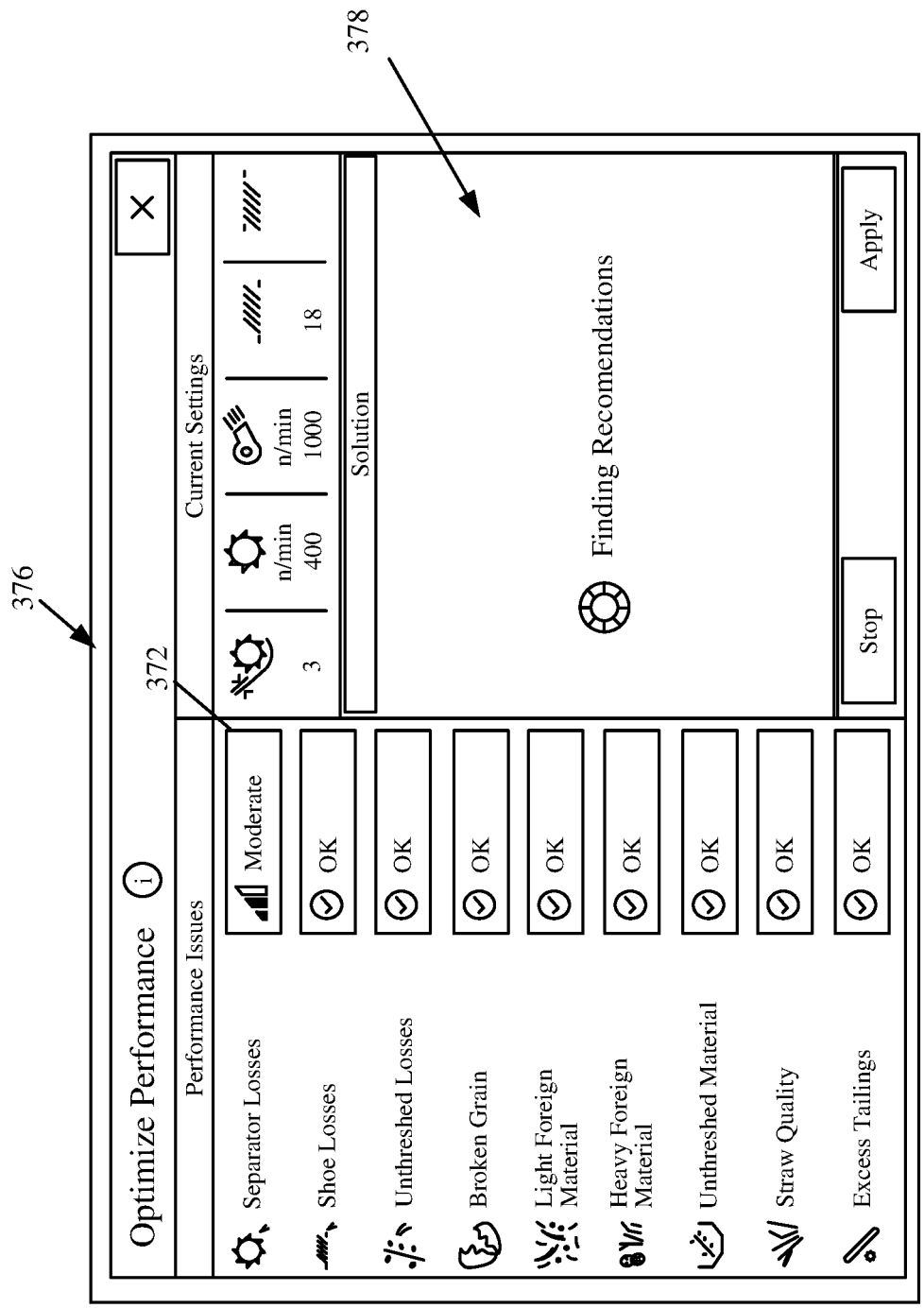

When this occurs, solution identification system 240 begins to identify solutions to the reported problem, and UEX control logic 232 illustratively generates a display, such as that shown at 378 in FIG. 5D, which indicates that recommendations are being located for the reported separator loss issue. It will be appreciated that, at this point, (or at any point in the process) operator 207 can also report another performance issue and assign a severity level, if more than one performance issue is being observed at a time. Solution identification system 210 then identifies solutions for the multiple reported issues.

Figure 5F:
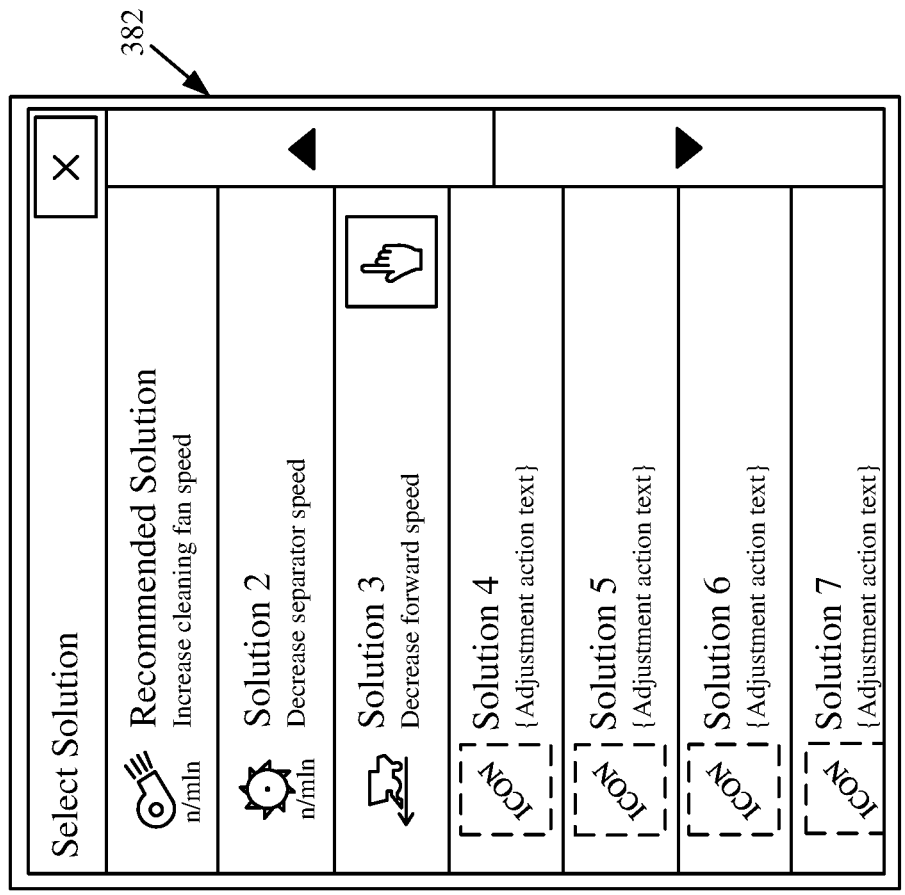
Figure 5E:
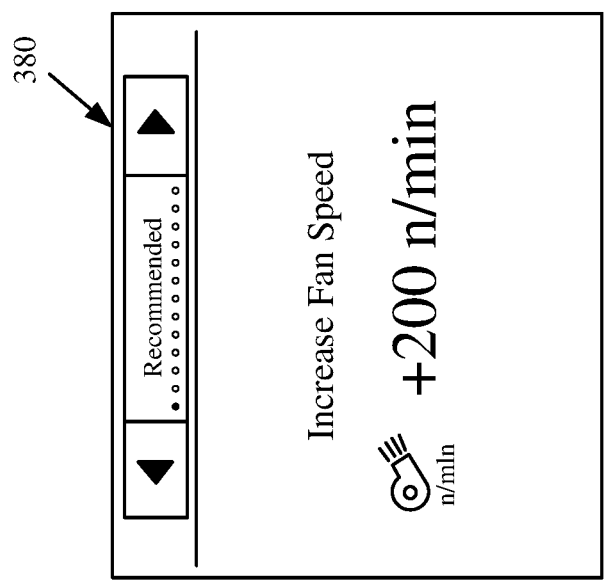
Figure 5G:
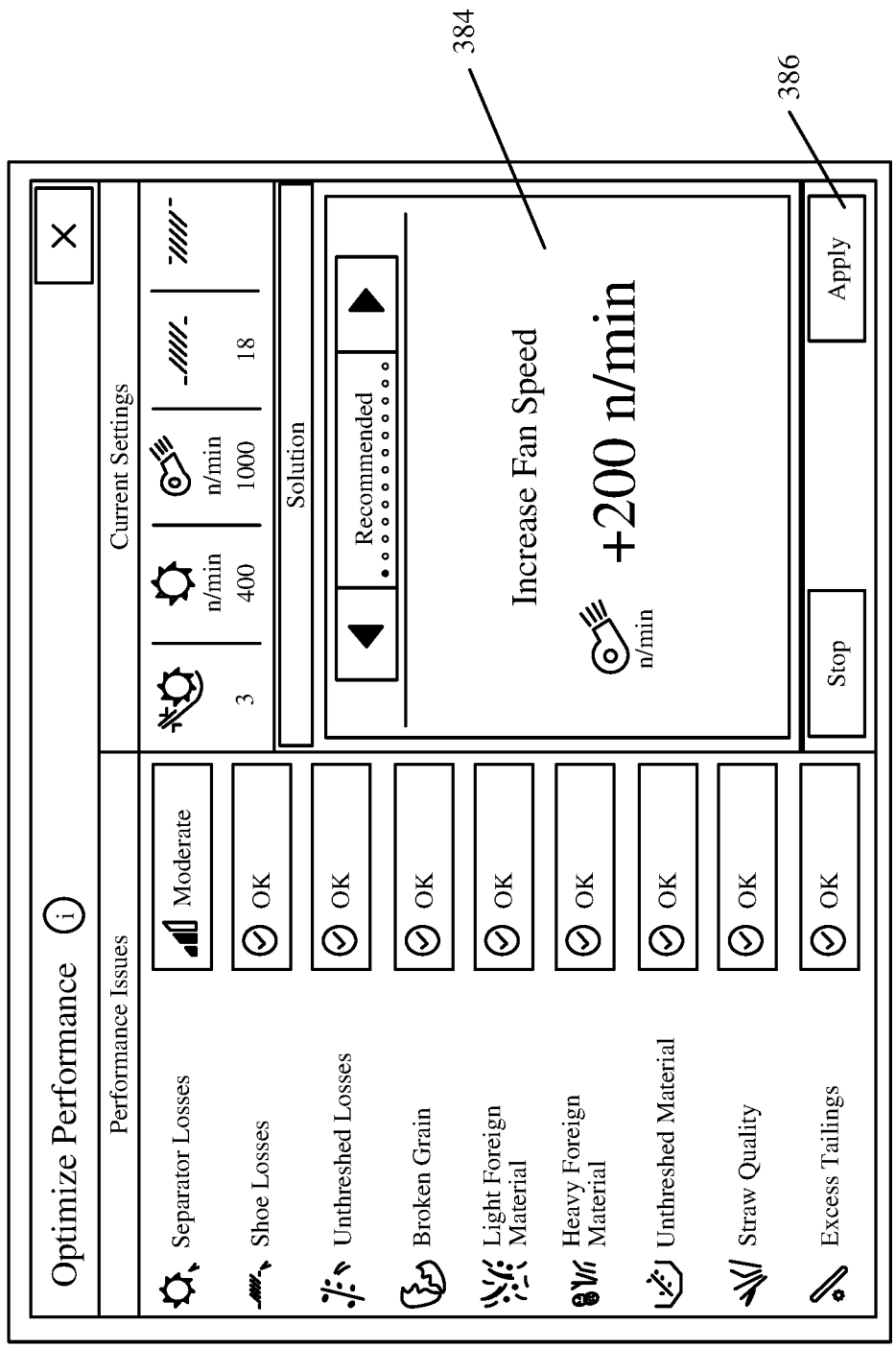
Figure 5H:
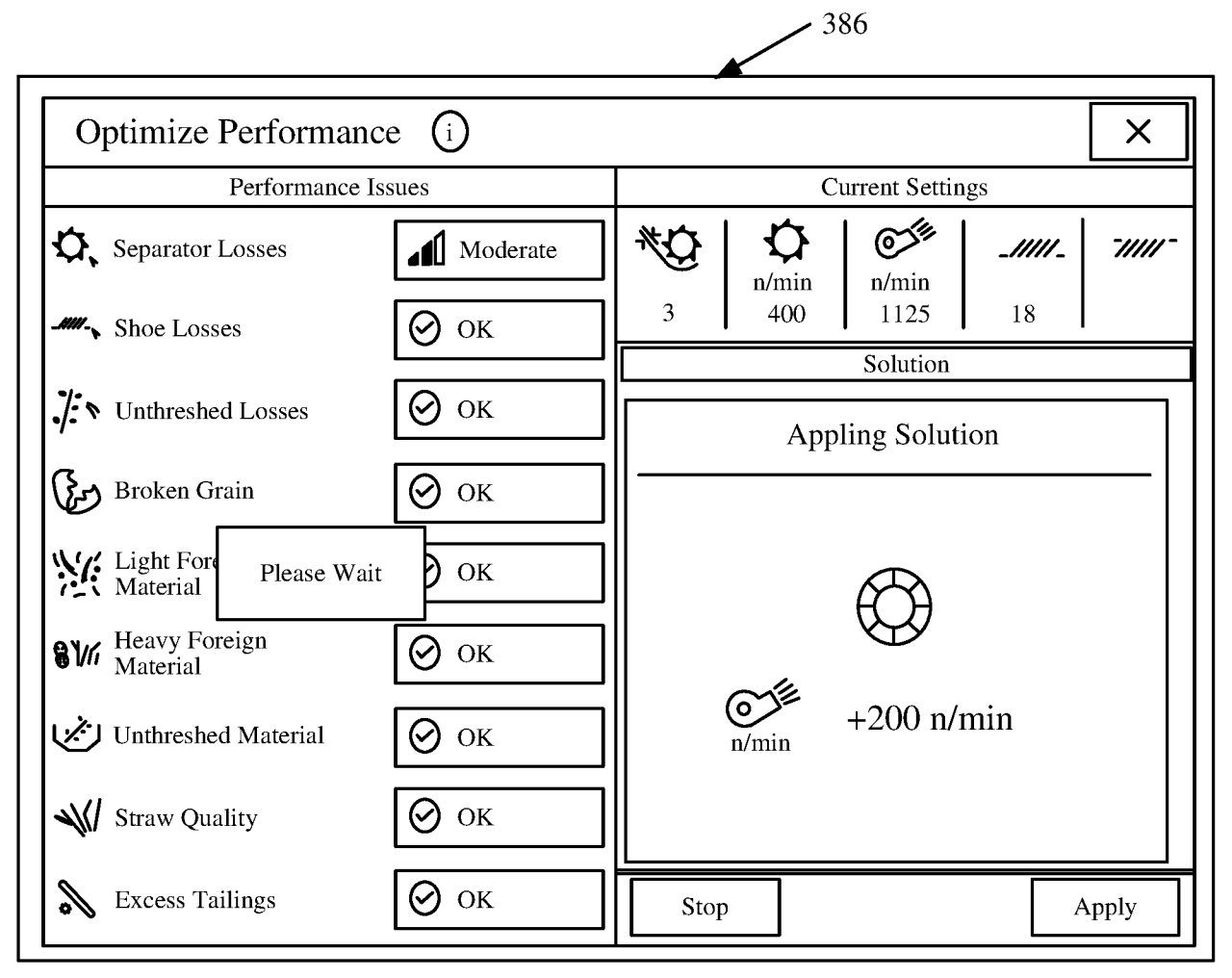

Once the solutions are identified, they can be provided to solution selector detection logic 242 which surfaces the list of potential solutions for user interaction. FIGS. 5E and 5F show two different examples of this. In FIG. 5E, one solution is shown at a given time, and a corresponding scroll actuator 380 is also provided so that the user can scroll to the right or left through the ranked list of possible solutions. In FIG. 5F, a scroll bar 382 is provided along with the list of recommended solutions so that the operator 207 can scroll through that list to select one. In either case, once the user has scrolled to a desired solution, that solution can be displayed, as indicated in FIG. 5G, in solution display portion 384. The user can then actuate "apply" actuator 386. Solution selector detection logic 242 illustratively detects these user interactions.

Once the "apply" actuator is actuated by operator 207, then control signal generator interaction logic 246 illustratively interacts with control signal generator 215 in order to control one or more controllable subsystems 210 to perform the set of corrective actions corresponding to the solution. If those actions can be performed automatically, then automated corrective actions can be taken. If not, however, and as described in greater detail below, manual instructions can be displayed for operator 207 so that the corrections can be made manually.

Figure 5I:
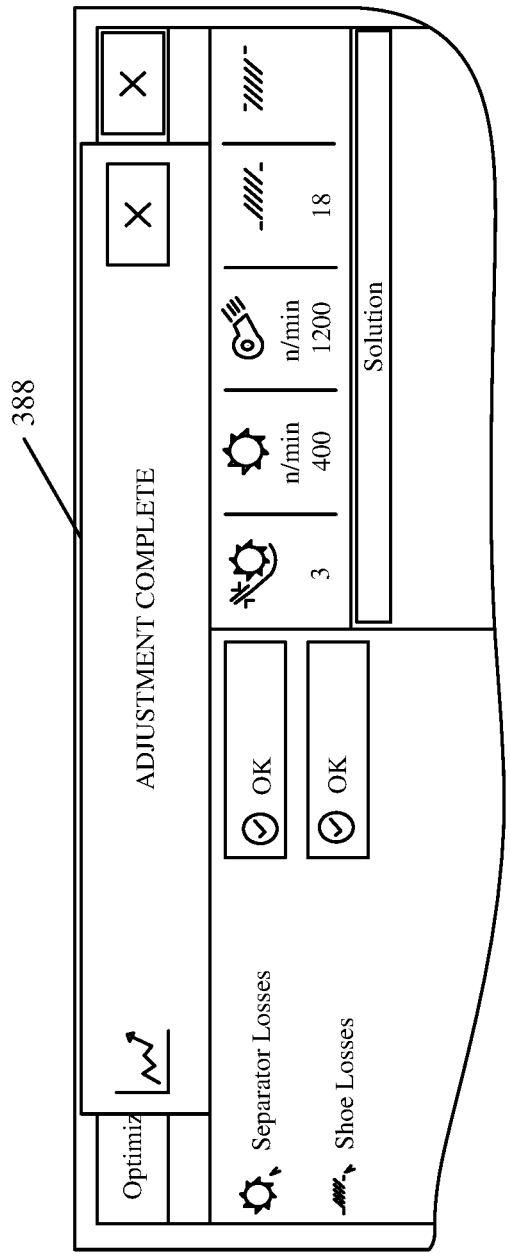

After the "apply" actuator 386 is actuated in FIG. 5G, then adjustment detector 266 detects when the adjustment has been made, and (in one example) timeout generator 264 sets a timeout so that operation of mobile harvesting machine 100 will continue until a steady performance state has been achieved, after the adjustment has been made. Thus, a display such as display 386 shown in FIG. 5H can be generated. This indicates that the adjustments are being applied. In the example shown, the corrective action is to increase the cleaning fan speed by 200 revolutions per minute. Once that has been achieved, as detected by adjustment detector 266, and once the timeout period set by timeout generator 264 has been reached, then (as shown in FIG. 5I) a display similar to that shown in FIG. 5B can be generated, along with a display item 388 indicating that the adjustment has been completed. In that case, operator 207 can again observe the performance of mobile harvesting machine 100 to determine whether any additional issues need to be reported. If so, they can be reported on the screen shown in FIG. 5B, after the time out period has passed.

Figure 6A:
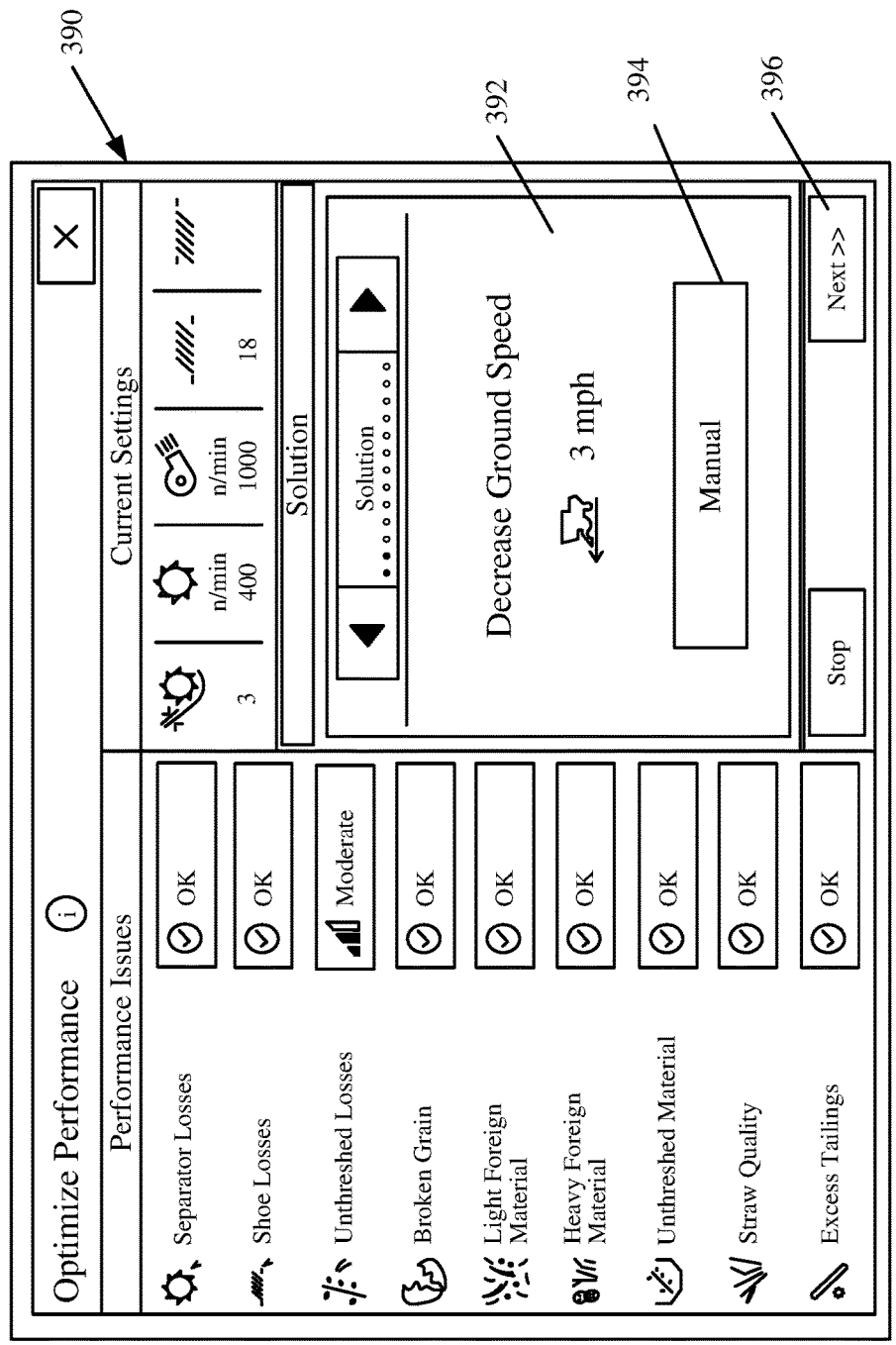
Figure 6B:
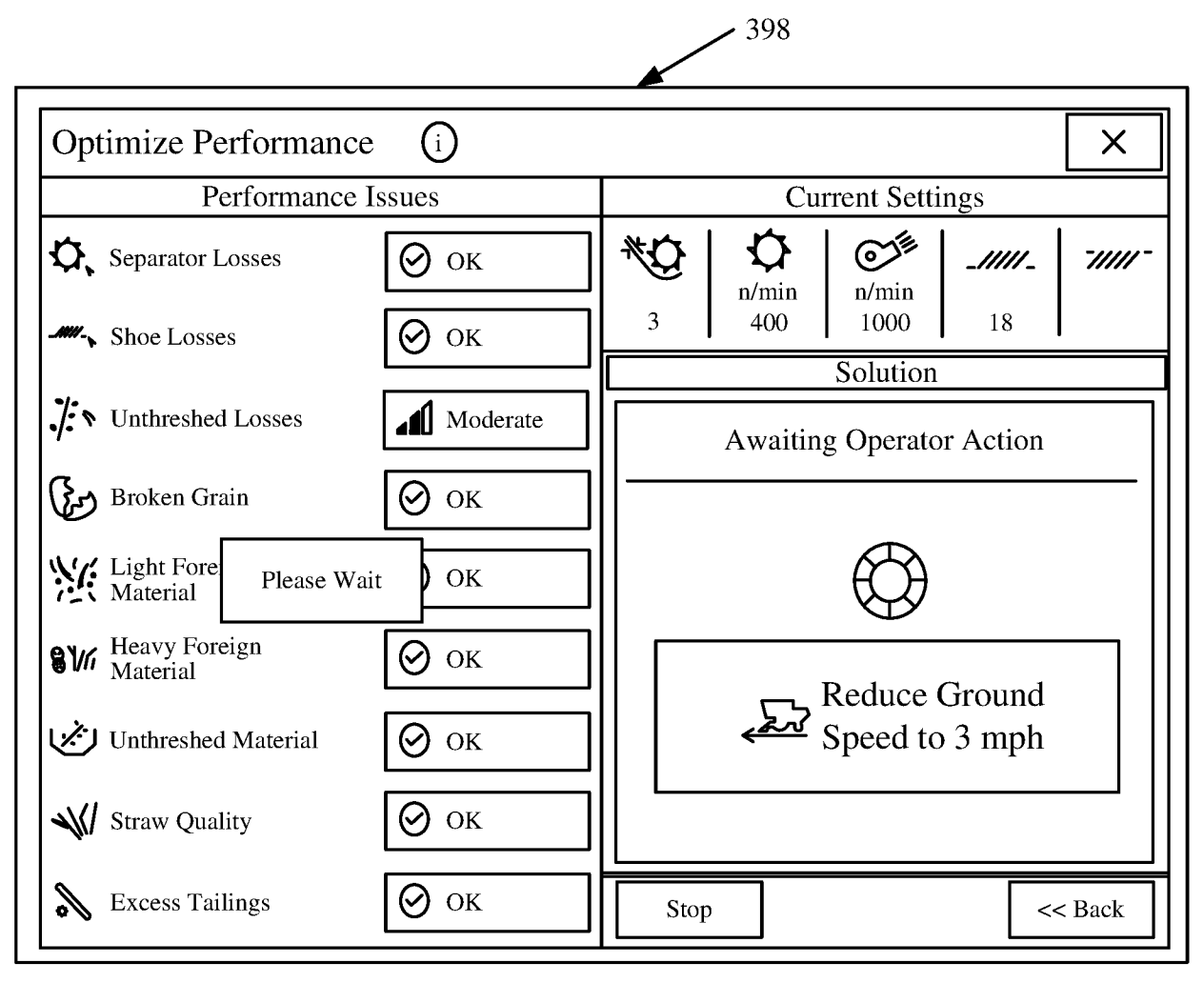
Figure 6C:
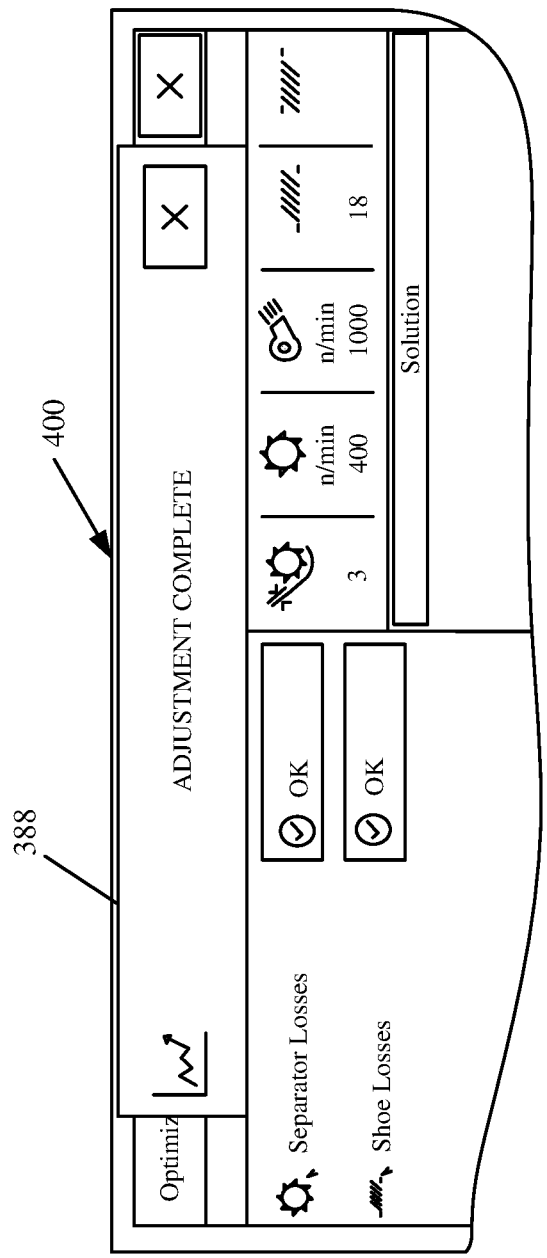

FIGS. 6A-6C show user interface displays that can be generated when the corrective actions include manual steps. As shown in FIG. 6A, a user interface display 390 has been generated by manual adjustment display generator logic 294 and indicates that a problem "unthreshed losses" has been reported with a medium severity level. The solution that has been surfaced by solution identification system 240 and solution selector detection logic 242 is to decrease the ground speed of harvesting machine 100 to 3 miles per hour. This is displayed in display portion 392. It also indicates that this action is to be taken manually, as indicated by block 394. Operator 207 can then actuate the "next" actuator 396, and user interface display 398 can be generated, which indicates that the system is waiting for operator 207 to reduce ground speed to 3 miles per hour. This is shown in FIG. 6B. When this occurs, the user interface display can be shown as indicated in display 400 in FIG. 6C. This can include the "adjustment complete" indicator 388 as shown in FIG. 5I as well.

Figure 6D:
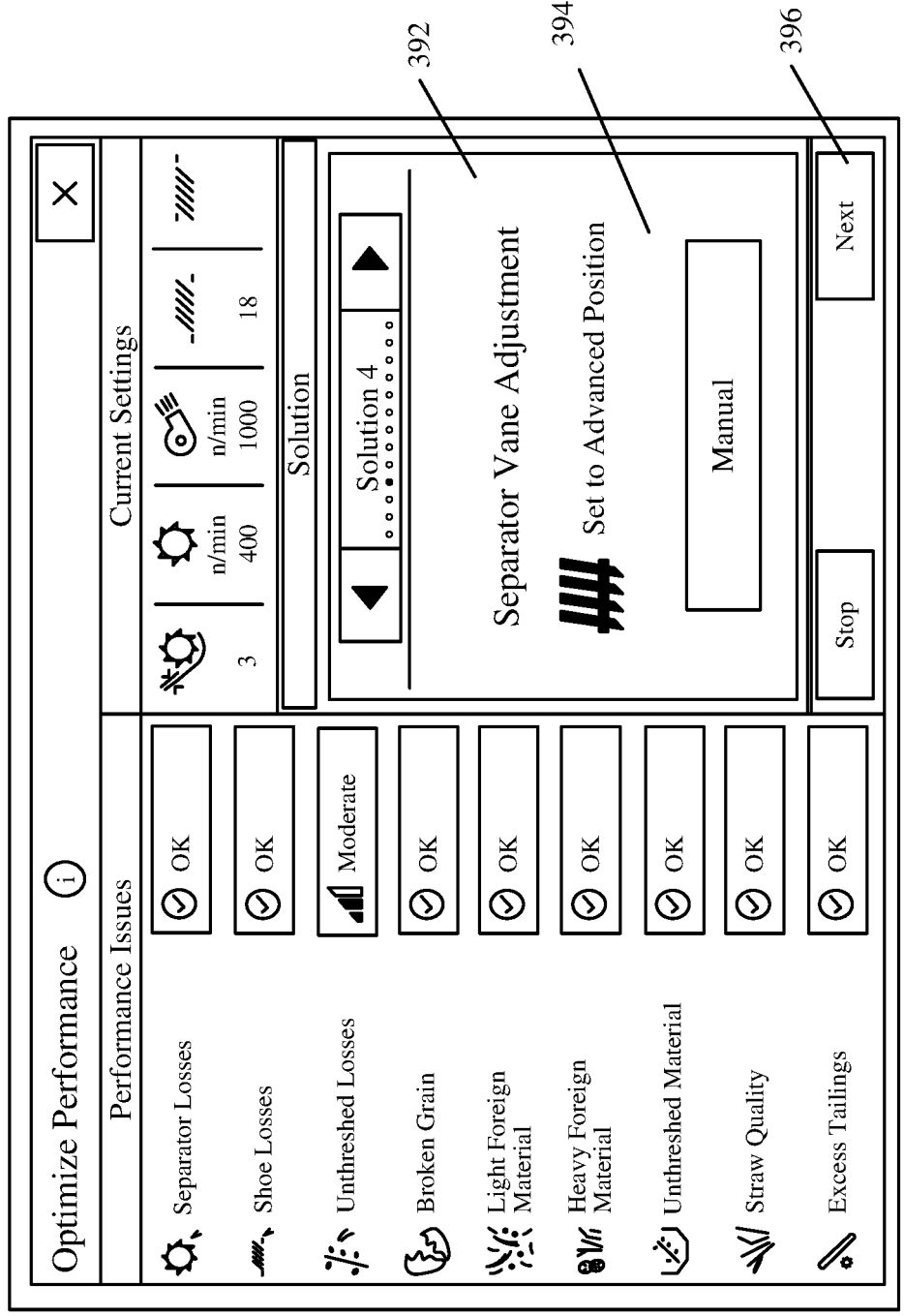
Figure 6E:
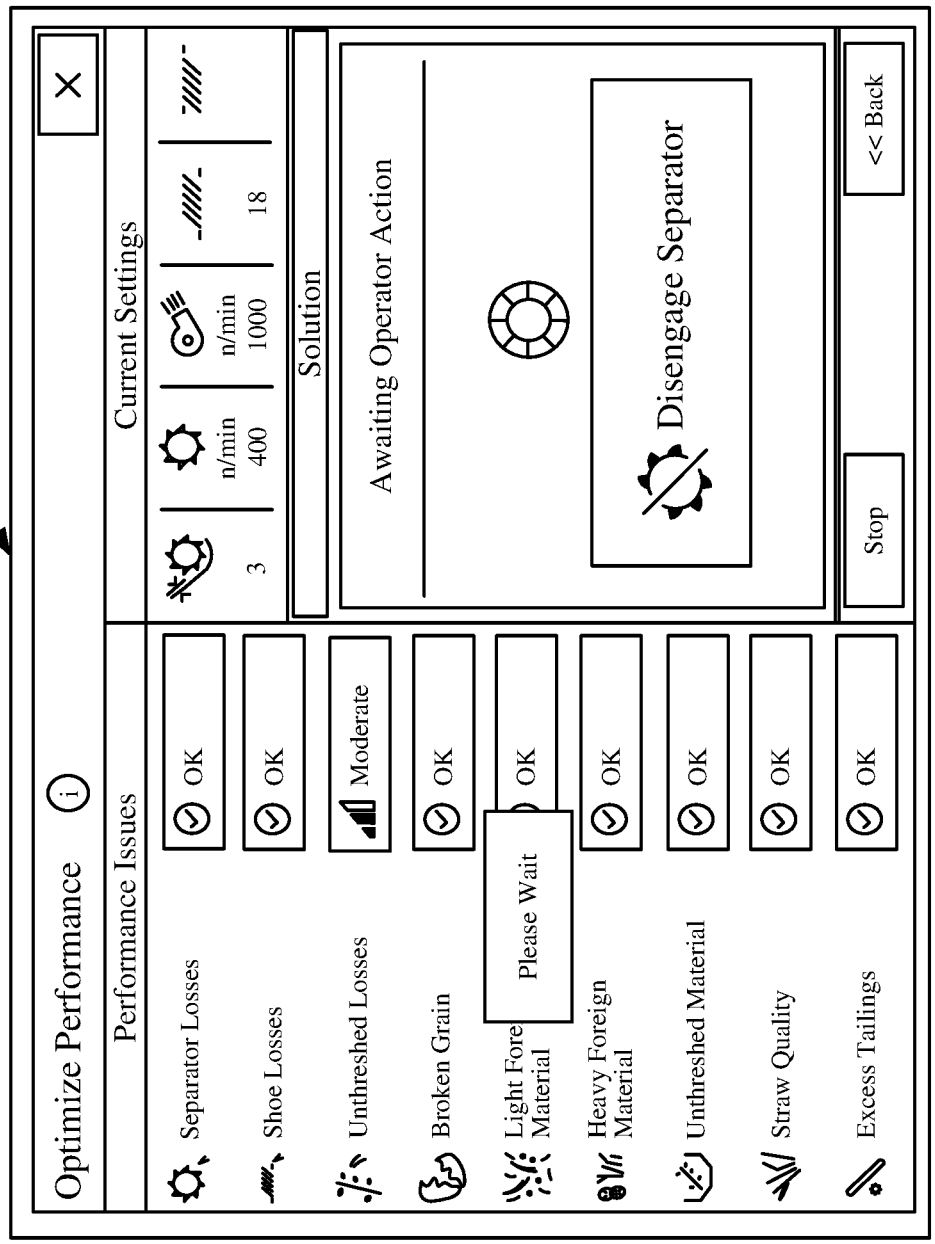
Figure 6F:
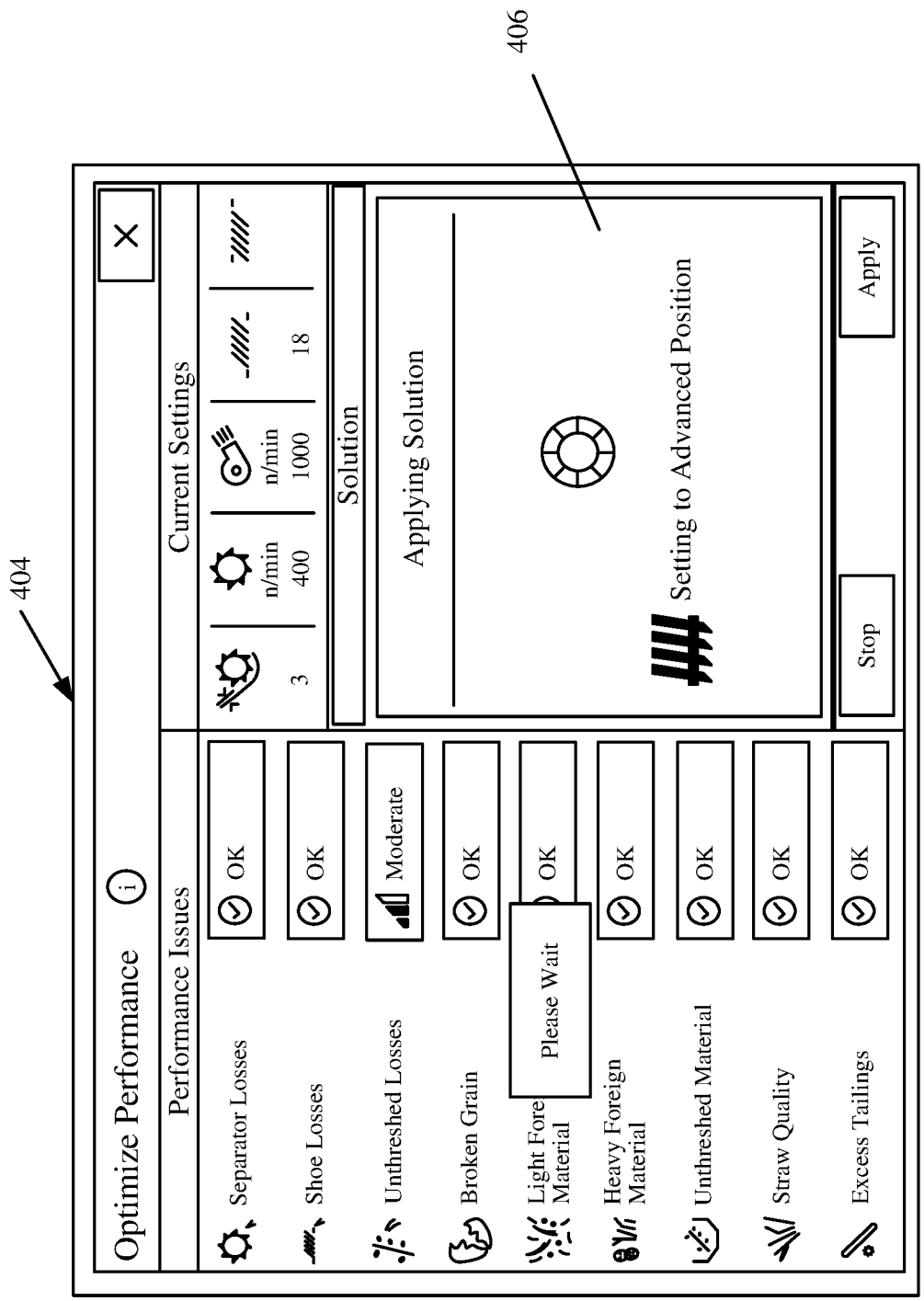

FIGS. 6D-6F show user interface displays that can be generated for a different manual solution that requires different manual actions. FIG. 6D again shows that operator 207 has reported an unthreshed losses problem that has a moderate severity level. However, the proposed solution shown in display portion 392 is now to make a separator vane adjustment. Again, this action is indicated as being manual as indicated at 394. When the operator actuates the "next" actuator 396, then user interface display 402 (shown in FIG. 6E) can be generated by manual adjustment display generator logic 244. This is similar to user interface display 398 shown in FIG. 6B, except that it indicates that the manual action to be taken is to adjust the separator. It again, however, indicates that it is awaiting operator action.

Specifically, as shown in FIG. 6E, the manual action that needs to be taken is to disengage the separator so that the separator vanes can automatically be set to its advanced position. Thus, in FIG. 6E, the system is waiting for the operator to disengage the separator. Once this happens, then the display 404 illustrated in FIG. 6F can be generated, which indicates that the control signal generator interaction logic 246 is now interacting with control signal generator 215 to set the separator vanes to their advanced position as displayed generally at 406. Once the adjustment detector 266 detects that the adjustment has been made and timeout generator 264 detects that the timeout period has lapsed, so that machine 100 has again reached a steady performance state, then the display can return to that shown in FIG. 6C indicating that the adjustment has been completed and that no issues are currently reported.

Figure 7A:
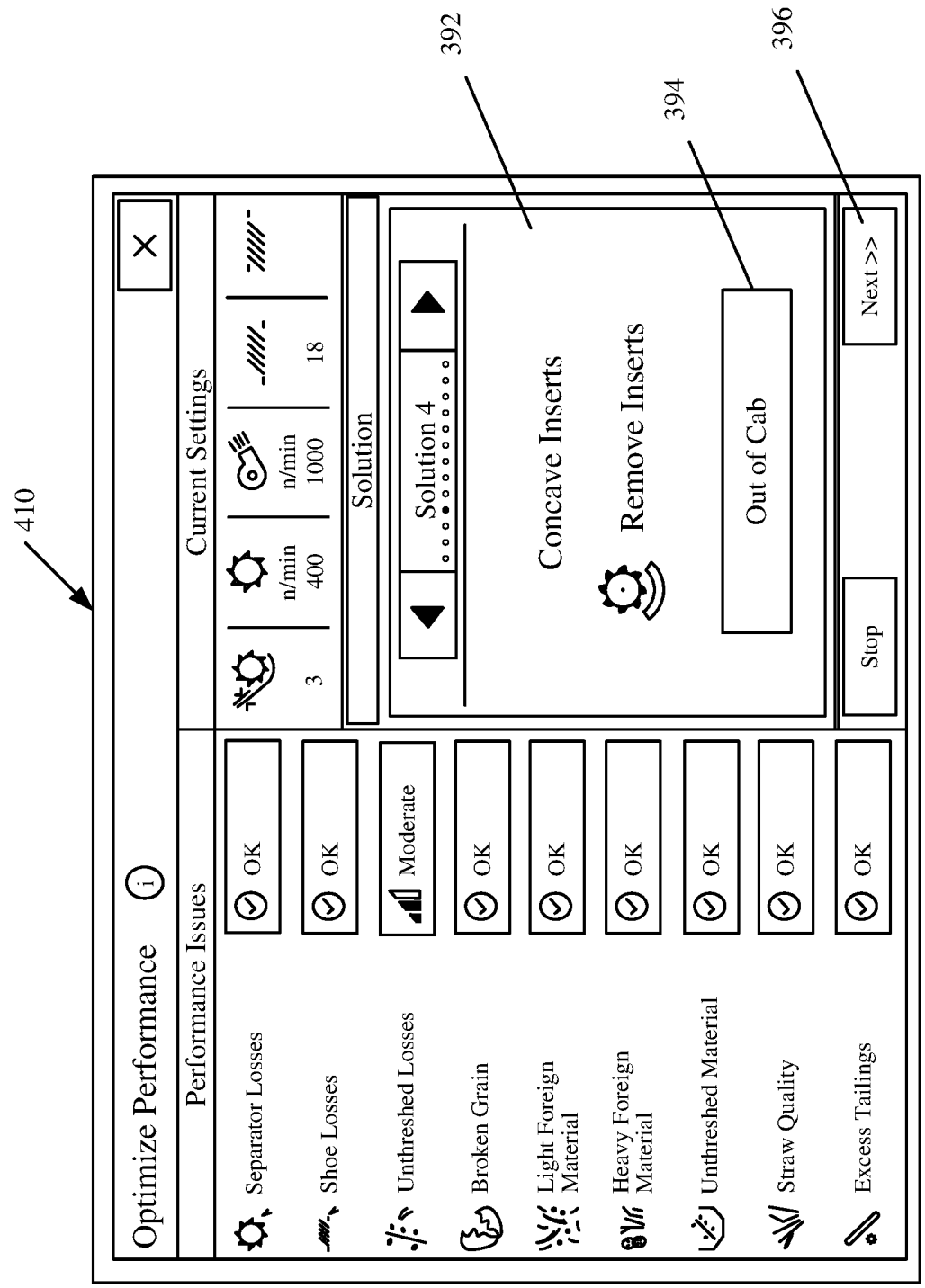
Figure 7B:
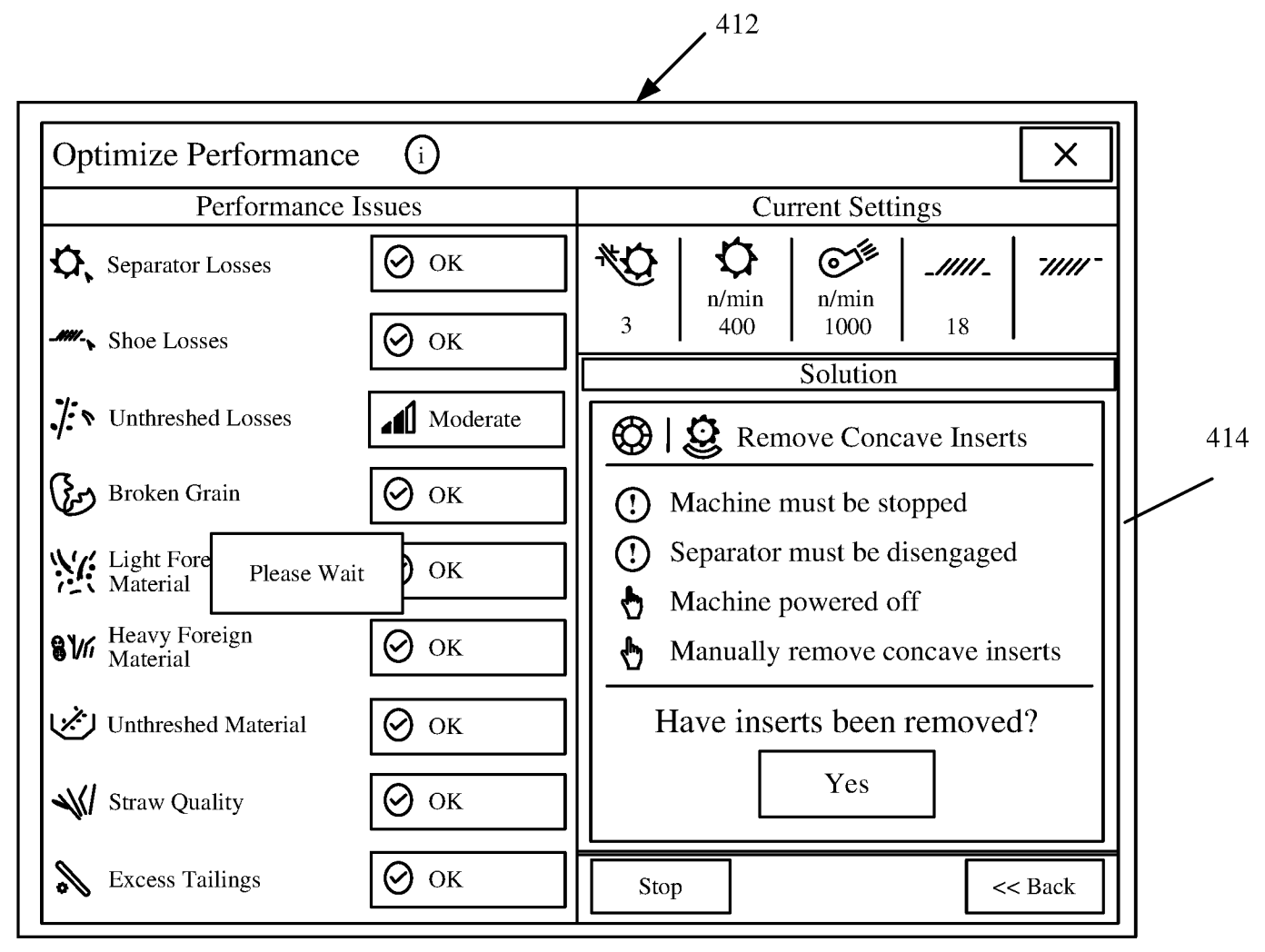
Figure 7C:
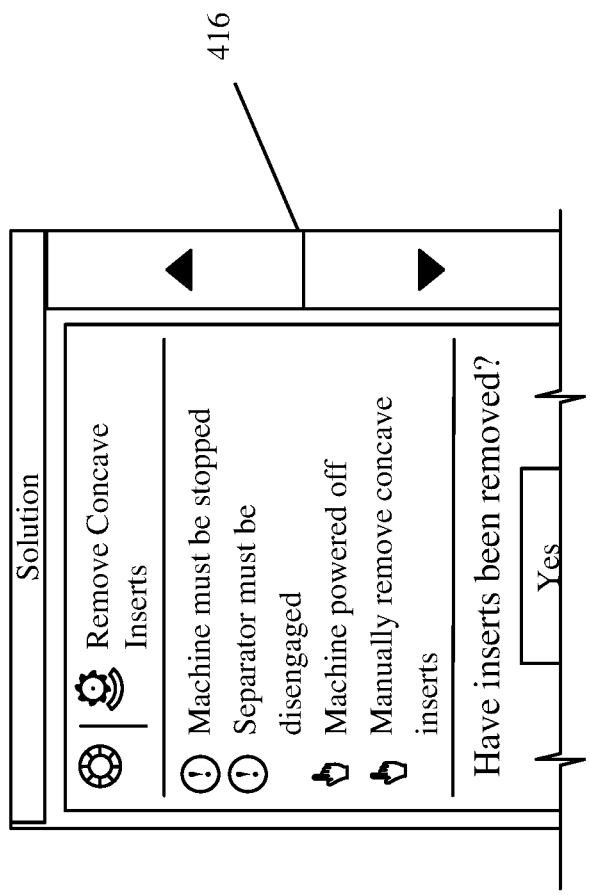
Figure 7D:
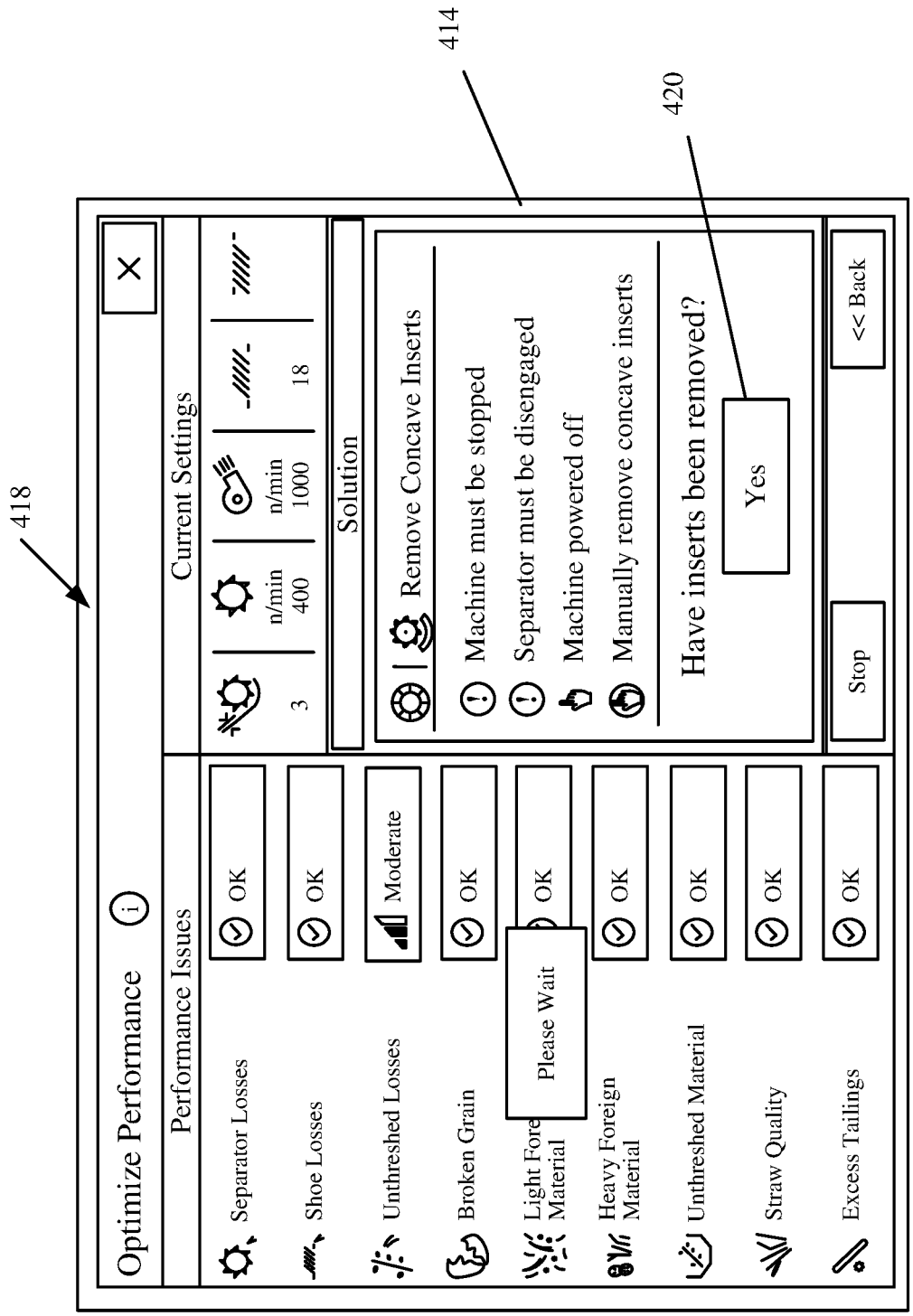

FIGS. 7A-7D show user interface displays that can be generated where the corrective action corresponding to the identified solution is an out-of-cab adjustment that needs to be made by operator 207. User interface display 410, shown in FIG. 7A, is similar to user interface display 390 shown in FIG. 6A, and similar items are similarly numbered. However, in FIG. 7A, the corrective actions corresponding to the identified solution are displayed at 392 and indicate that the concave inserts are to be removed. This is indicated at 394 as being an action that needs to be taken outside of the cab. When the user actuates the next actuator 396, then a display, such as display 412 can be generated as shown in FIG. 7B. This shows that manual adjustment display generator logic 244 has generated a display portion 414 that indicates the particular steps that need to be taken by operator 207 in order to implement the manual steps for the desired solution. FIG. 7C shows that, where there are too many steps to display in display portion 414, a scroll or other actuator 416 can be provided to scroll through the manual steps that are to be taken. FIG. 7D shows that user interface display 418 can be generated, that is similar to that shown in FIG. 7B, and similar items are similarly numbered. However, in FIG. 7D, actuator 420 is now active so that operator 207 can indicate that the concave inserts have indeed, been removed. When this happens, again, timeout generator 264 causes the system to wait for a timeout period until the machine performance can reach steady state, after the concave inserts have been removed, and a display such as that shown in FIG. 6C can again be generated.

It can thus be seen that the present description provides a user interface that allows an operator of a mobile harvesting machine to report a single issue, or multiple issues, at the same time. It also allows the operator 207 to report a severity level corresponding to each reported issue. Solutions and corresponding corrective actions are automatically identified and surfaced for the user. Where more than one solution is identified, they can be surfaced as a ranked list which can be viewed by operator 207, and from which a solution can be selected for implementation. The corrective actions can be automated so that control signals are automatically generated to perform the corrective actions, or they can be manual actions so that control signals are generated to surface a set of manual actions that are to be performed by operator 207. Then, the system can, in one example, be commanded to wait for a timeout period before new issues are reported.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
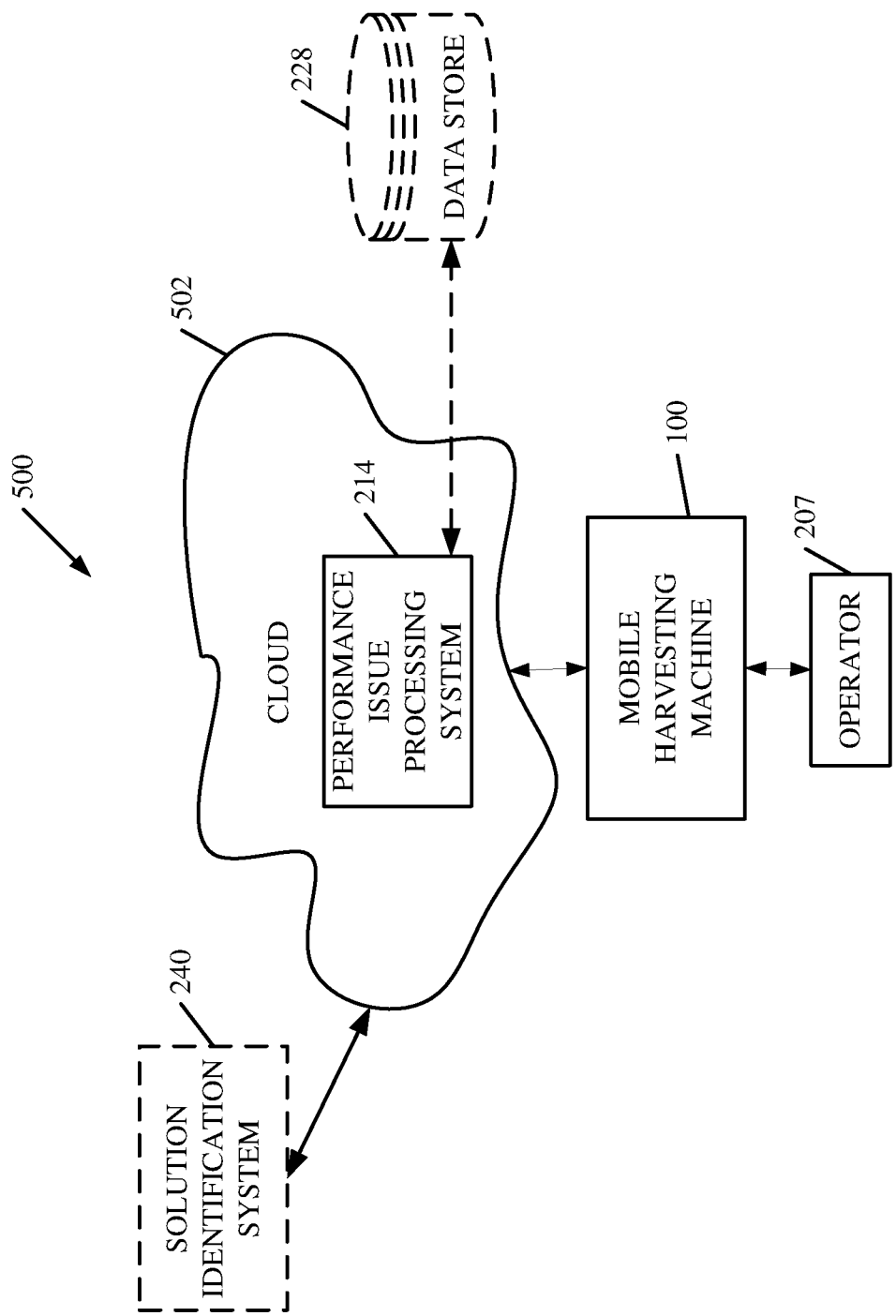
FIG. 8 shows one example of the mobile machine, as part of a cloud computing architecture.

FIG. 8 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 8, some items are similar to those shown in FIGS. 1 and 2 and they are similarly numbered. FIG. 8 specifically shows that performance issue processing system 214 can be located at a remote server location 502. Therefore, harvester 100 accesses those systems through remote server location 502.

FIG. 8 also depicts another example of a remote server architecture. FIG. 5 shows that it is also contemplated that some elements of FIGS. 1 and 2 are disposed at remote server location 502 while others are not. By way of example, data store 228 or solution identification system 240 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
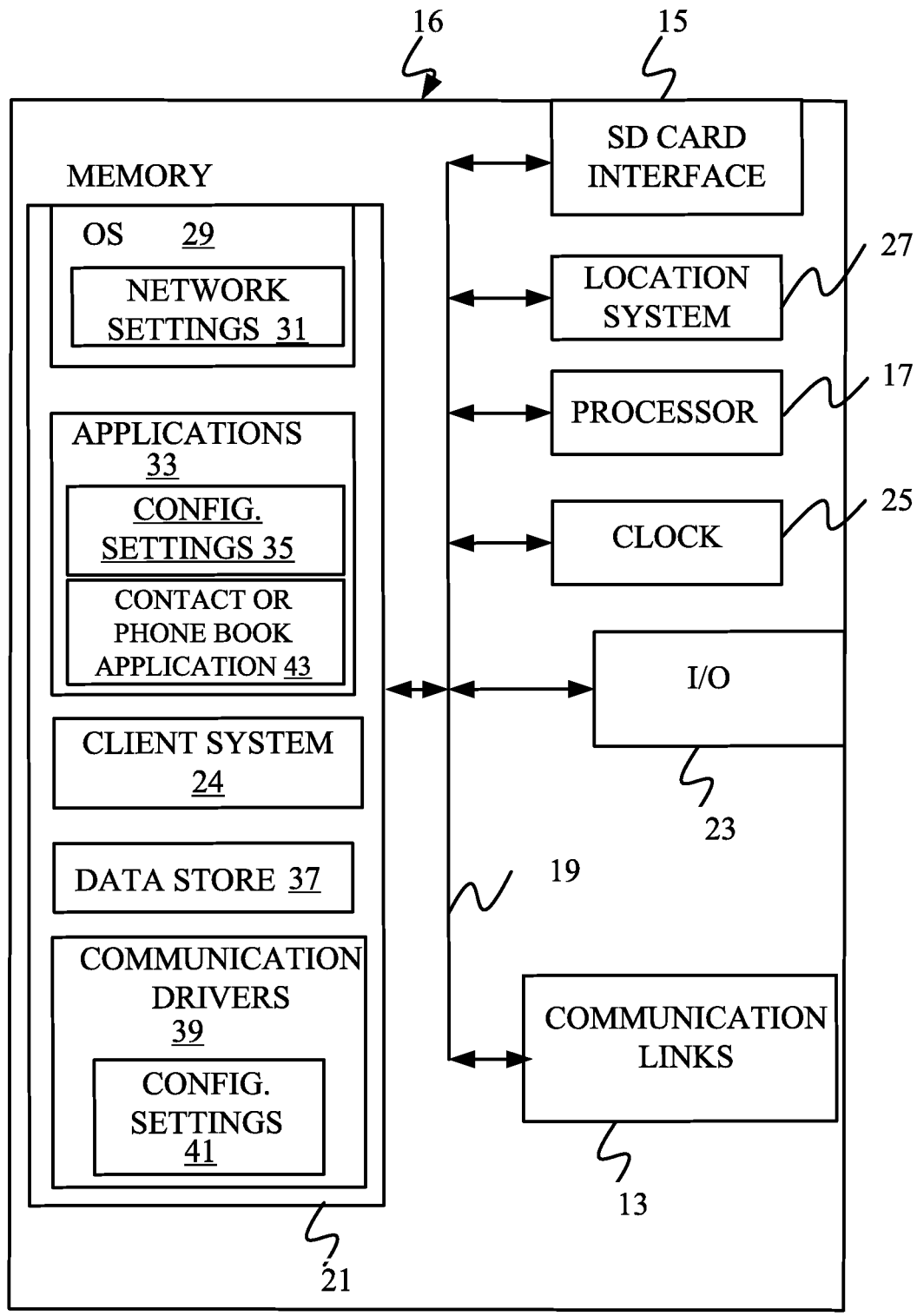
FIGS. 9-11 show examples of mobile devices that can be used with the mobile harvesting machine and the cloud computing architectures shown in the previous figures.
Figure 10:
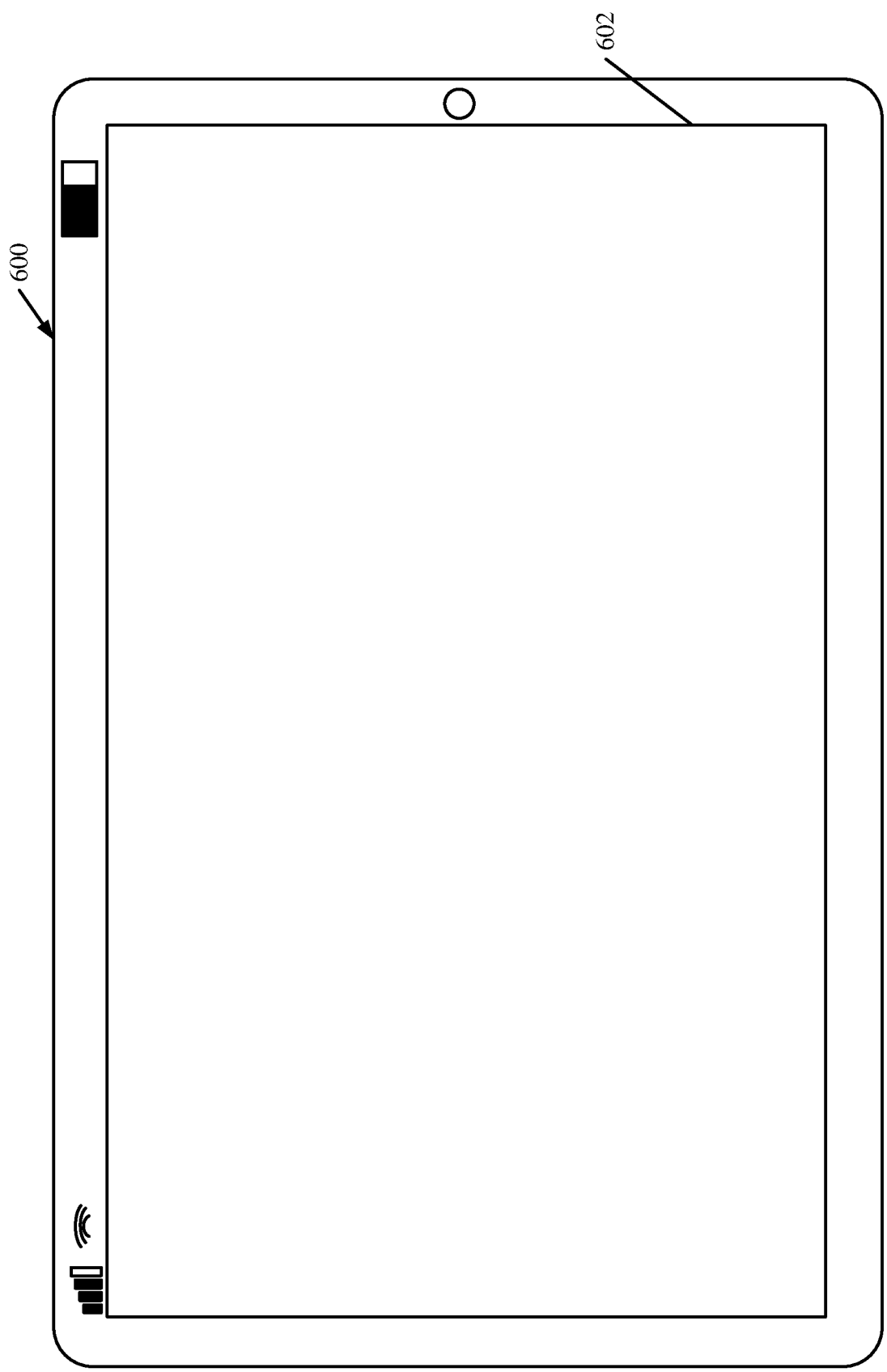
Figure 11:
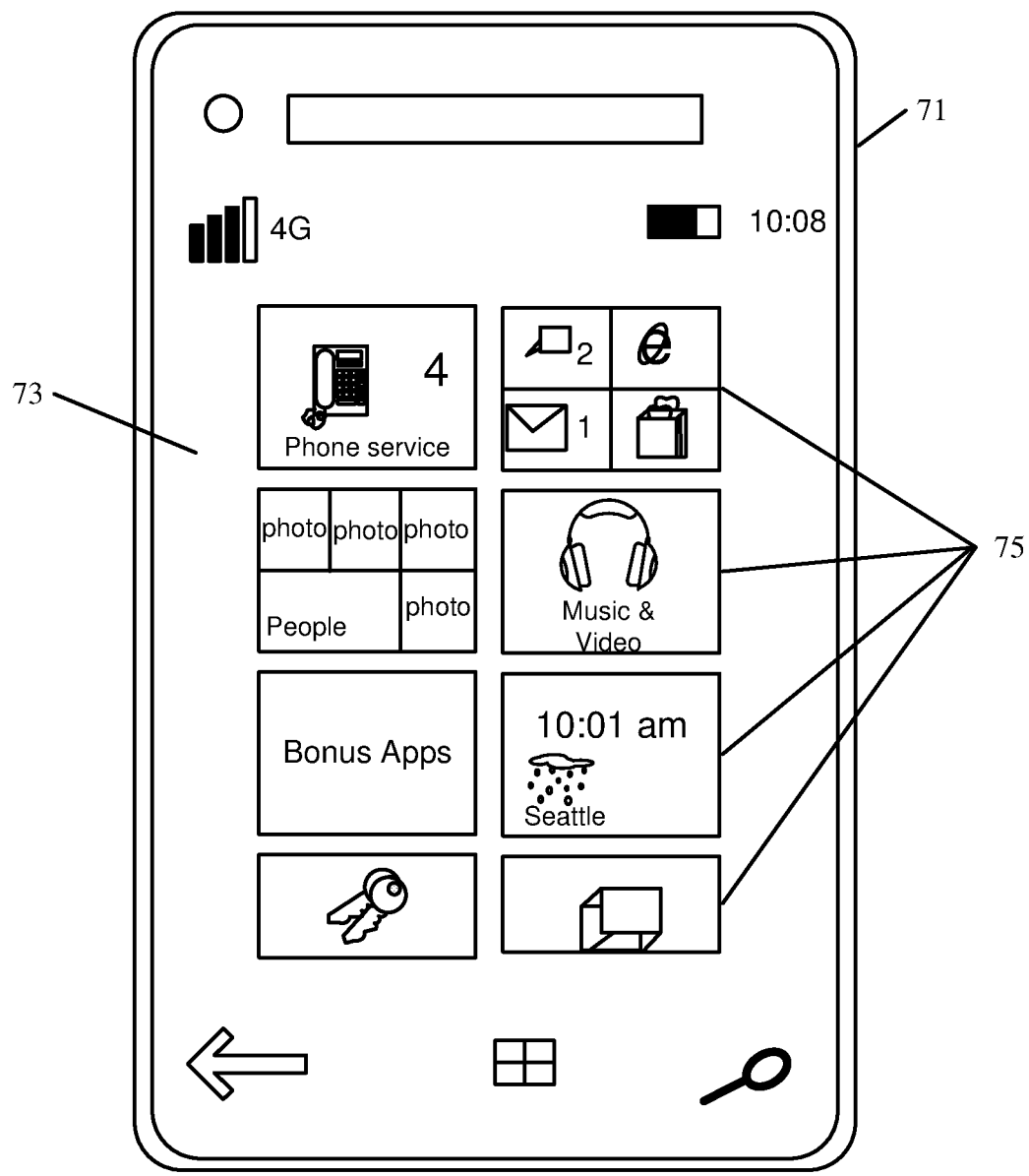

FIG. 9 is a simplified block diagram of one illustrative embodiment of a handheld or mobile computing device that can be used as a user's or client's hand held device 16, in which the present system (or parts of it) can be deployed. For instance, a mobile device can be deployed in the operator compartment 101 of harvester 100 for use in generating, processing, or displaying the user interface for reporting issues and identifying and applying solutions. FIGS. 10-11 are examples of handheld or mobile devices.

FIG. 9 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication through one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from FIG. 2) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 10 shows one example in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 11 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
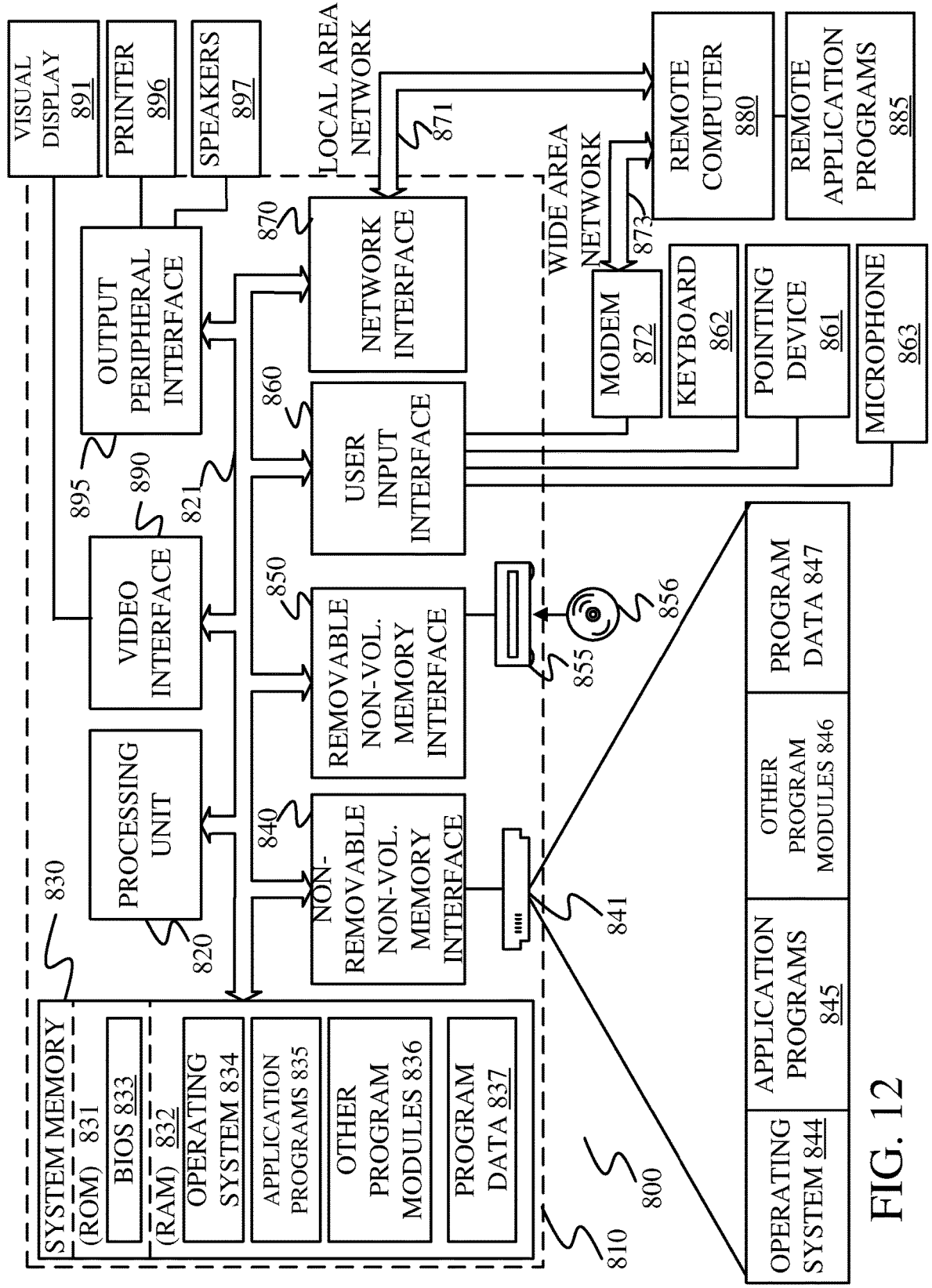
FIG. 12 is a block diagram showing one example of a computing environment that can be used in the mobile harvesting machine and/or in the architectures shown in the previous figures.

FIG. 12 is one example of a computing environment in which elements of FIG. 1, or FIG. 2 or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile harvesting machine, comprising:
performance issue detection logic that generates a user interface with an issue selection user input mechanism that is actuatable to identify a machine performance issue, and that detects actuation of the issue selection user input mechanism;
severity level detection logic that generates a severity level user input mechanism that is actuatable to identify a severity level corresponding to the identified machine performance issue, and that detects actuation of the severity level user input mechanism;
a solution identification system that identifies a solution that has corresponding actions, based on the identified machine performance issue and the corresponding severity level; and
a control signal generator that generates an action signal based on the actions corresponding to the identified solution.

Example 2 is the mobile harvesting machine of any or all previous examples wherein the control signal generator is configured to generate the action signal as a control signal that controls a controllable subsystem to perform the actions.

Example 3 is the mobile harvesting machine of any or all previous examples wherein the control signal generator is configured to generate the control signal to control the controllable subsystem to modify at least one of machine settings in the controllable subsystem, or machine configuration of the mobile harvesting machine.

Example 4 is the mobile harvesting machine of any or all previous examples wherein, when the actions corresponding to the identified solution comprise manual actions, then the control signal generator is configured to generate the action signal as a control signal that controls a user interface mechanism to display an indication of the manual actions.

Example 5 is the mobile harvesting machine of any or all previous examples wherein the performance issue detection logic is configured to generate the issue selection user input mechanism as being actuatable to identify a plurality of different machine performance issues that are occurring simultaneously.

Example 6 is the mobile harvesting machine of any or all previous examples wherein the severity level detection logic is configured to generate the severity level user input mechanism as being actuatable to identify a different severity level corresponding to each of the plurality of different machine performance issues identified.

Example 7 is the mobile harvesting machine of any or all previous examples and further comprising:
an adjustment detector configured to detect when the actions corresponding to the identified solution are completed; and
a timeout generator configured to generate a timeout signal that disables the performance issue detection logic for a timeout period to allow the mobile harvesting machine to perform harvesting operations during the timeout period, prior to detecting a subsequent actuation of the issue selection user input mechanism.

Example 8 is the mobile harvesting machine of any or all previous examples wherein the solution identification system comprises:
solution identifier logic configured to identify a set of possible solutions based on the identified machine performance issues and corresponding severity levels.

Example 9 is the mobile harvesting machine of any or all previous examples wherein the solution identification system is configured to generate an interactive solution display that displays the set of possible solutions, with a solution selection user input mechanism that is actuated to select one of the set of possible solutions for application to the mobile harvesting machine.

Example 10 is the mobile harvesting machine of any or all previous examples wherein the solution identification system comprises:
ranking logic configured to rank the set of possible solutions based on a likelihood of addressing any identified machine performance issues, the solution identification system being configured to generate the interactive solution display that displays the set of possible solutions, with the solution selection user input mechanisms, in rank order.

Example 11 is the mobile harvesting machine of any or all previous examples wherein the control signal generator is configured to generate the action signal as a plurality of different control signals that control a plurality of different controllable subsystems to perform the actions, based on the plurality of different machine performance issues identified and the corresponding plurality of different corresponding severity levels.

Example 12 is a mobile harvesting machine, comprising:
performance issue detection logic that generates a user interface with an issue selection user input mechanism that is actuatable to identify a plurality of different machine performance issues that are occurring simultaneously, and that detects actuation of the issue selection user input mechanism;
severity level detection logic that generates a severity level user input mechanism that is actuatable to identify a different severity level corresponding to each of the plurality of different machine performance issues identified;
a solution identification system that identifies a solution that has corresponding actions, based on the plurality of different identified machine performance issues and the corresponding severity levels; and
a control signal generator that generates an action signal based on the actions corresponding to the identified solution.

Example 13 is the mobile harvesting machine of any or all previous examples wherein the solution identification system comprises:
  solution identifier logic configured to identify a set of possible solutions based on the identified machine performance issues and corresponding severity levels, and wherein the solution identification system is configured to generate an interactive solution display that displays the set of possible solutions, with a solution selection user input mechanism that is actuated to select one of the set of possible solutions for application to the mobile harvesting machine.

Example 14 is the mobile harvesting machine of any or all previous examples wherein the solution identification system comprises:
  ranking logic configured to rank the set of possible solutions based on a likelihood of addressing the identified machine performance issues, the solution identification system being configured to generate the interactive solution display that displays the set of possible solutions, with the solution selection user input mechanisms, in rank order.

Example 15 is the mobile harvesting machine of any or all previous examples wherein the control signal generator is configured to generate the action signal as a plurality of different control signals that control a plurality of different controllable subsystems to perform the actions, based on the plurality of different machine performance issues identified and the corresponding plurality of different corresponding severity levels.

Example 16 is a method of controlling a mobile harvesting machine, the method comprising:
  generating a user interface with an issue selection user input mechanism that is actuatable to identify a machine performance issue;
  detecting actuation of the issue selection user input mechanism;
  generating a severity level user input mechanism that is actuatable to identify a severity level corresponding to the identified machine performance issue;
  detecting actuation of the severity level user input mechanism;
  identifying a solution that has corresponding actions, based on the identified machine performance issue and the corresponding severity level; and
  generating an action signal based on the actions corresponding to the identified solution.

Example 17 is the method of any or all previous examples wherein generating an action signal comprises:
  generating a control signal that controls a controllable subsystem to perform the actions.

Example 18 is the method of any or all previous examples wherein generating a user interface with an issue selection user input mechanism comprises:
  generating the issue selection user input mechanism as being actuatable to identify a plurality of different machine performance issues that are occurring simultaneously.

Example 19 is the method of any or all previous examples wherein generating a severity level user input mechanism comprises:
  generating the severity level user input mechanism as being actuatable to identify a different severity level corresponding to each of the plurality of different machine performance issues identified.

Example 20 is the method of any or all previous examples wherein identifying a solution comprises:
  identifying a set of possible solutions based on the identified machine performance issues and corresponding severity levels;
  ranking the set of possible solutions based on a likelihood of addressing the plurality of different identified machine performance issues; and
  generate an interactive solution display that displays the set of possible solutions, in rank order, with a solution selection user input mechanism that is actuated to select one of the set of possible solutions for application to the mobile harvesting machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile harvesting machine, comprising:
  at least one processor;
  memory storing instructions executable by the at least one processor, wherein the instructions, when executed, cause the mobile harvesting machine to:
    generate a user interface with an issue selection user input mechanism;
    detect a user actuation of the issue selection user input mechanism indicative of a machine performance issue that is one of multiple machine performance options presented though the user interface;
    select the machine performance issue based on the detection of the user actuation of the issue selection user input mechanism;
    generate the user interface with a severity level user input mechanism;
    detect a user actuation of the severity level user input mechanism indicative of a severity level that is one of multiple severity level options presented through the user interface as user selectable severity level options specifically associated with the selected machine performance issue;
    select the severity level based on the detected user actuation of the severity level user input mechanism;
    identify a solution that has a corresponding actions, based on a combination of the selected machine performance issue and the selected severity level; and
    generate a control signal that controls the mobile harvesting machine based on the corresponding solution and its corresponding action.

2. The mobile harvesting machine of claim 1 wherein the control signal controls a controllable subsystem to perform the corresponding actions.

3. The mobile harvesting machine of claim 2 wherein the control signal controls the controllable subsystem to modify at least one of machine settings in the controllable subsystem, or machine configuration of the mobile harvesting machine.

4. The mobile harvesting machine of claim 1 wherein, when the action corresponding to the identified solution comprise a manual action.

5. The mobile harvesting machine of claim 1 wherein the multiple machine performance options are each identified through the user interface as a characteristic of operation performance of the harvesting machine that can be visually observed by an operator during operation of the mobile harvesting machine.

6. The mobile harvesting machine of claim 1 wherein the severity level user input mechanism is actuatable to identify a different severity level corresponding to each of the multiple machine performance options presented through the user interface.

7. The mobile harvesting machine of claim 6 wherein the instructions further cause the mobile harvesting machine to:
detect when the actions corresponding to the identified solution is completed; and
generate a timeout signal that disables a performance issue detection function for a timeout period to allow the mobile harvesting machine to perform harvesting operations during the timeout period, prior to detecting a subsequent actuation of the issue selection user input mechanism.

8. The mobile harvesting machine of claim 1 wherein the instructions further cause the mobile harvesting machine to:
identify a set of possible solutions, including said solution, based on said combination.

9. The mobile harvesting machine of claim 8 wherein the instructions further cause the mobile harvesting machine to generate an interactive solution display that displays the set of possible solutions on the user interface, with a solution selection user input mechanism that is actuated to select one of the set of possible solutions for application to the mobile harvesting machine.

10. The mobile harvesting machine of claim 9 wherein the instructions further cause the mobile harvesting machine to:
rank the set of possible solutions; and
generate the interactive solution display that displays the set of possible solutions in rank order.

11. The mobile harvesting machine of claim 1 wherein identifying the solution based on the combination further comprises identifying the solution based on at least one other selected machine performance issue and an associated user-identified security level.

12. A mobile harvesting machine, comprising:
one or more processors;
severity level detection logic, implemented by at least one of the processors, and configured to:
generate a severity level user input mechanism;
detect user actuation of the severity level user input mechanism, the user actuation of the severity level user input mechanism being indicative of a user-initiated identification of a user-adjustable severity level for a corresponding user-selected performance issue; and
select, the severity level based on the detected user actuation of the severity level user input mechanism;
a solution identification system, implemented by at least one of the processors, and configured to identify a solution that has a corresponding action based at least on the selected severity level; and
a control signal generator, implemented by at least one of the processors, and configured to generate a control signal that controls the mobile harvesting machine based on the action that corresponds to the identified solution.

13. The mobile harvesting machine of claim 12 wherein the solution identification system comprises:
solution identifier logic configured to identify a set of possible solutions that includes said solution and that is based at least on the selected severity level, and wherein the solution identification system is configured to generate an interactive solution display that displays the set of possible solutions, with a solution selection user input mechanism that is actuated to select one of the set of possible solutions for application to the mobile harvesting machine.

14. The mobile harvesting machine of claim 13 wherein the solution identification system comprises:
ranking logic configured to rank the set of possible solutions based on a likelihood of addressing the identified machine performance issues, the solution identification system being configured to generate the interactive solution display that displays the set of possible solutions in rank order.

15. The mobile harvesting machine of claim 12 wherein the control signal generator is configured to generate the control signal as a plurality of different control signals that control a plurality of different controllable subsystems to perform the corresponding action.

16. A method of controlling a mobile harvesting machine, the method comprising:
generating a user interface with an issue selection user input mechanism that is actuatable to identify a machine performance issue;
generating a severity level user input mechanism that is actuatable to identify a severity level corresponding to the identified machine performance issue;
detecting actuation of the severity level user input mechanism that indicates the severity level corresponding to the identified machine performance issue;
identifying a solution that has a corresponding action, wherein identifying comprises identifying based on a combination of the identified machine performance issue and the severity level corresponding to the identified machine performance issue;
generating an action signal based on the action that corresponds to the identified solution; and
controlling the mobile harvesting machine based at least on the action signal.

17. The method of claim 16 wherein generating an action signal comprises:
generating a control signal that controls a controllable subsystem to perform the actions.

18. The method of claim 16 wherein generating a user interface with an issue selection user input mechanism comprises:
generating the issue selection user input mechanism as being actuatable to identify a plurality of different machine performance issues that include said machine performance issue.

19. The method of claim 18 wherein generating a severity level user input mechanism comprises:
generating the severity level user input mechanism as being actuatable to identify a different severity level corresponding to each of the plurality of different machine performance issues.

20. The method of claim 19 wherein identifying the solution comprises:
ranking a set of possible solutions that includes said solution; and
generating and displaying an interactive solution display that displays the set of possible solutions.

* * * * *